US010639224B2

(12) United States Patent
Nagayama

(10) Patent No.: US 10,639,224 B2
(45) Date of Patent: May 5, 2020

(54) MESSAGE DISPLAY APPARATUS, A MESSAGE DISPLAY METHOD, AND A MESSAGE DISPLAY PROGRAM

(71) Applicant: AMBASS INC., Tokyo (JP)

(72) Inventor: Hiroshi Nagayama, Tokyo (JP)

(73) Assignee: AMBASS INC., Tokyo (JP)

( * ) Notice: Subject to any disclaimer, the term of this patent is extended or adjusted under 35 U.S.C. 154(b) by 138 days.

(21) Appl. No.: 15/768,088

(22) PCT Filed: Nov. 20, 2017

(86) PCT No.: PCT/JP2017/041618
§ 371 (c)(1),
(2) Date: Apr. 13, 2018

(87) PCT Pub. No.: WO2018/097088
PCT Pub. Date: May 31, 2018

(65) Prior Publication Data
US 2019/0083346 A1 Mar. 21, 2019

(30) Foreign Application Priority Data
Nov. 26, 2016 (JP) ................................. 2016-229614

(51) Int. Cl.
*G06F 15/16* (2006.01)
*A61G 99/00* (2006.01)
(Continued)

(52) U.S. Cl.
CPC ............. *A61G 99/00* (2013.01); *G06F 13/00* (2013.01); *G06Q 10/10* (2013.01); *G06Q 50/10* (2013.01);
(Continued)

(58) Field of Classification Search
CPC ........ A61G 99/00; G06F 13/00; G06Q 10/10; G06Q 50/10; H04L 51/10; H04L 51/18; H04L 51/20; H04L 51/24; H04M 11/00
(Continued)

(56) References Cited

U.S. PATENT DOCUMENTS 8,909,670 B2 * 12/2014 Neal ..................... G06F 16/532
707/770
9,053,198 B2 * 6/2015 Harrison ............. G06F 16/9554
(Continued)

FOREIGN PATENT DOCUMENTS

JP 2002-092202 A 3/2002
JP 2002-172057 A 6/2002
(Continued)

OTHER PUBLICATIONS

Feb. 27, 2018 International Search Report issued in Patent Application No. PCT/JP2017/041618.
(Continued)

*Primary Examiner* — Melvin H Pollack
(74) *Attorney, Agent, or Firm* — Oliff PLC

(57) ABSTRACT

Message display apparatus disclosed in application includes: communication unit for receiving image information of gravestone transmitted from mobile terminal along with position information of mobile terminal; deceased person specification unit for specifying deceased person's identification information for identifying deceased, wherein deceased person's identification information is associated with image information of gravestone along with pre-stored position information of gravestone; first message output unit for outputting and displaying first message on mobile terminal; browsing control unit for controlling first message so as to be unbrowsable in mobile terminal for predetermined period after browsable period has elapsed, and controlling
(Continued)

first message so as to be browsable if communication unit receives image information of gravestone along with position information of mobile terminal after predetermined period has elapsed; and second message output unit for outputting and displaying second message on mobile terminal after predetermined period has elapsed.

11 Claims, 17 Drawing Sheets

(51) Int. Cl.
*H04L 12/58* (2006.01)
*G06F 13/00* (2006.01)
*G06Q 10/10* (2012.01)
*G06Q 50/10* (2012.01)
*H04M 11/00* (2006.01)

(52) U.S. Cl.
CPC .............. *H04L 51/10* (2013.01); *H04L 51/18* (2013.01); *H04L 51/20* (2013.01); *H04L 51/24* (2013.01); *H04M 11/00* (2013.01)

(58) Field of Classification Search
USPC .......................................................... 709/206
See application file for complete search history.

(56) References Cited

U.S. PATENT DOCUMENTS

| | | | | |
|---|---|---|---|---|
| 9,141,188 B2* | 9/2015 | Fein | ........................ | G06F 3/011 |
| 9,143,898 B1* | 9/2015 | Barr | ...................... | H04W 4/025 |
| 9,160,782 B1* | 10/2015 | Meagher | ............ | G06F 16/9537 |
| 9,200,469 B1* | 12/2015 | Mindrum | ............ | G06F 16/9537 |
| 9,261,598 B1* | 2/2016 | Robinson | ................ | G01S 19/14 |
| 9,277,020 B2* | 3/2016 | Childress | ................ | H04L 67/22 |
| 9,310,955 B2* | 4/2016 | Haswell | .................. | G06F 3/048 |
| 9,350,425 B1* | 5/2016 | Lewis | .................. | H04B 5/0068 |
| 9,443,231 B2* | 9/2016 | McPhee | ............. | G06Q 10/109 |
| 9,654,443 B2* | 5/2017 | Lindoff | ................. | H04W 8/005 |
| 9,729,650 B2* | 8/2017 | Westberg | ............ | H04L 67/2847 |
| 9,762,462 B2* | 9/2017 | Cherifi | .................... | G06F 16/00 |
| 9,772,738 B2* | 9/2017 | Na | .......................... | G06F 3/048 |
| 9,820,094 B2* | 11/2017 | Zhang | ................. | G06F 16/9535 |
| 9,948,468 B2* | 4/2018 | Nayshtut | ............... | H04L 9/3268 |
| 9,987,184 B2* | 6/2018 | Borovinov | ............. | A61G 99/00 |
| 10,030,406 B2* | 7/2018 | Montgomery | ........ | E04H 13/008 |
| 10,140,373 B2* | 11/2018 | Toon | ................... | G06F 16/9535 |
| 10,165,103 B2* | 12/2018 | Choi | ................ | H04M 1/72538 |
| 10,289,880 B2* | 5/2019 | Rasheed | ............... | G06T 19/006 |
| 2006/0029199 A1 | 2/2006 | Osterer et al. | | |
| 2012/0197949 A1* | 8/2012 | Taylor | .................... | G06Q 10/06 707/808 |
| 2013/0080532 A1* | 3/2013 | Stewart | .................. | G06Q 50/01 709/204 |
| 2013/0332563 A1* | 12/2013 | Yuen | ..................... | G06O 99/00 709/217 |
| 2014/0122627 A1* | 5/2014 | Arnold | .................... | H04L 51/02 709/206 |
| 2015/0127604 A1 | 5/2015 | Gunn et al. | | |
| 2015/0218844 A1* | 8/2015 | Adair | .................... | E04H 13/006 705/26.3 |
| 2015/0256608 A1* | 9/2015 | Nowell | ................... | H04L 67/10 709/204 |
| 2016/0050535 A1* | 2/2016 | Mansfield | ............. | H04W 4/025 455/456.3 |
| 2016/0217539 A1* | 7/2016 | Strohofer | ............. | G06Q 50/186 |
| 2016/0253771 A1* | 9/2016 | Pinocchio | ........... | G06Q 50/186 705/27.2 |
| 2016/0275103 A1 | 9/2016 | Robinson et al. | | |
| 2017/0154465 A1* | 6/2017 | Calvert | ................. | G06T 19/006 |
| 2017/0317956 A1* | 11/2017 | Yelvington | ........... | H04L 51/046 |
| 2017/0331924 A1* | 11/2017 | Katori | ..................... | H04L 67/18 |
| 2018/0218624 A1* | 8/2018 | Osseiran | .................. | G09B 5/06 |
| 2019/0114861 A1* | 4/2019 | Durham, III et al. | ...................... | H04W 12/06 |
| 2019/0180852 A1* | 6/2019 | Jiao | ........................ | G16H 10/60 |

FOREIGN PATENT DOCUMENTS

| | | |
|---|---|---|
| JP | 2008-510233 A | 4/2008 |
| JP | 2010-108298 A | 5/2010 |
| JP | 2014-229292 A | 12/2014 |
| JP | 2015-165856 A | 9/2015 |
| JP | 2016-81502 A | 5/2016 |

OTHER PUBLICATIONS

A visit-to-a-grave-GOAR-tomb, <http://nlab.itmedia.co.jp/nl/articles/1608/15/news089.html> [online], Aug. 15, 2016 (Retreived Jan. 10, 2017).

* cited by examiner

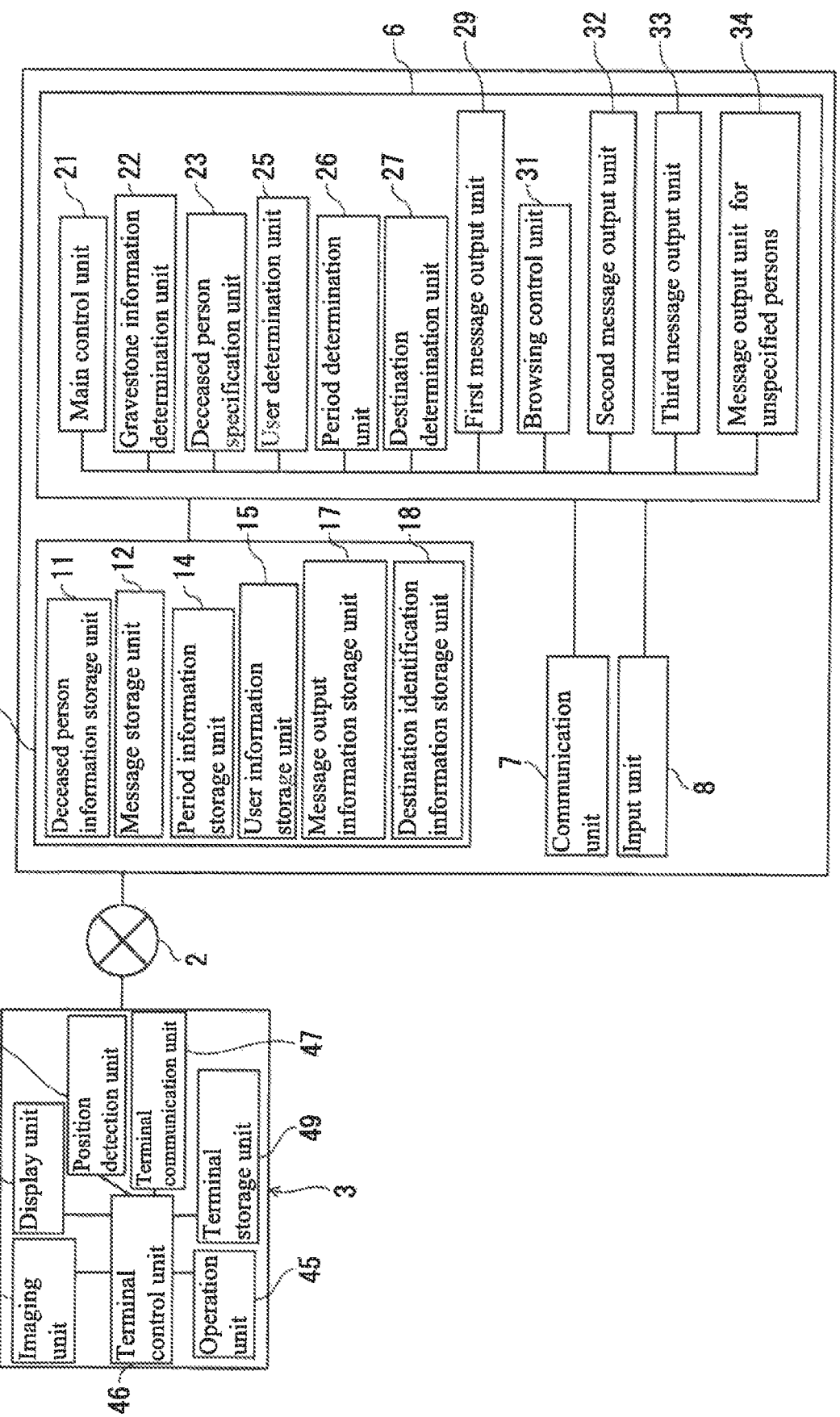

FIG.2

| Data classification | Data example |
|---|---|
| 51 — Deceased ID (deceased person's identification) | × × × × × |
| 52 — Deceased name | Taro YAMADA |
| 54 — Image information of graveston | 🪦 |
| 55 — Position information of gravestone | × × × × × |

11

| Data classification | Data example |
|---|---|
| 51 — Deceased ID (deceased person's identification) | × × × × × |
| 71 — First message ID | × × × × × |
| 72 — First message | 👤💬 |
| 73 — Second message ID | × × × × × |
| 74 — Second message | 👤💬 |
| 76 — Third message ID | × × × × × |
| 77 — Third message | 👤💬 |
| 78 — Message ID for unspecified persons | × × × × × |
| 79 — Message for unspecified persons | 👤💬 |

12

14

| Data classification | Data example |
|---|---|
| 51 — Deceased ID (deceased person's identification) | × × × × × |
| 82 — Date of death information | year, month, day |
| 83 — First grave-visitation period information (first distribution period information) | year, month, day, hour, minute to year, month, day, hour, minute |
| 84 — First browsable period information | year, month, day, hour, minute to year, month, day, hour, minute |
| 85 — First non-display period information | |
| 86 — Second grave-visitation period information (second distribution period information) | year, month, day, hour, minute to year, month, day, hour, minute |
| 87 — Second browsable period information | year, month, day, hour, minute to year, month, day, hour, minute |
| 88 — Second non-display period information | |
| 89 — Third grave-visitation period information (third distribution period information) | year, month, day, hour, minute to year, month, day, hour, minute |

FIG.3
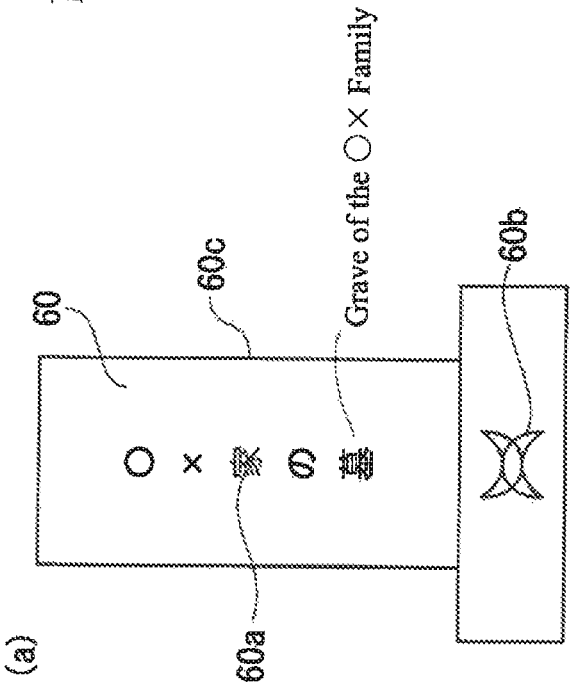
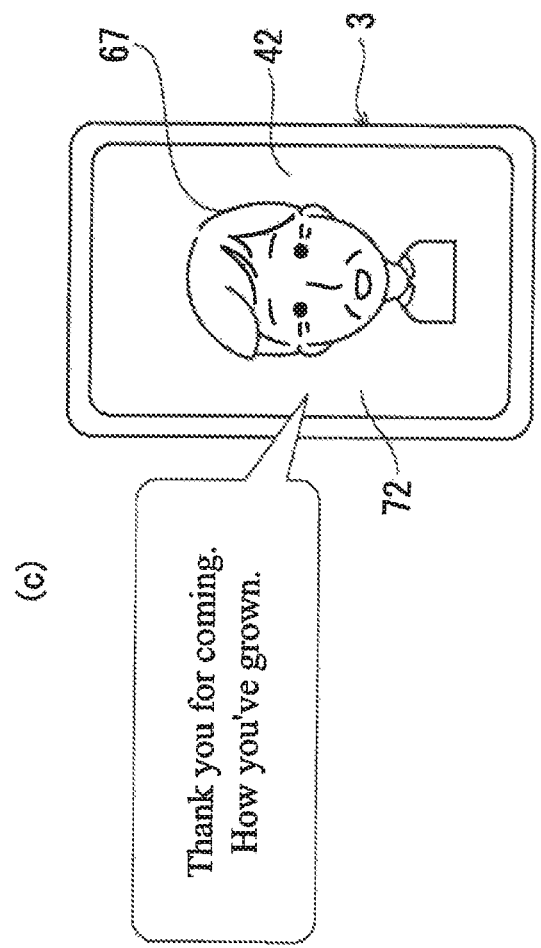
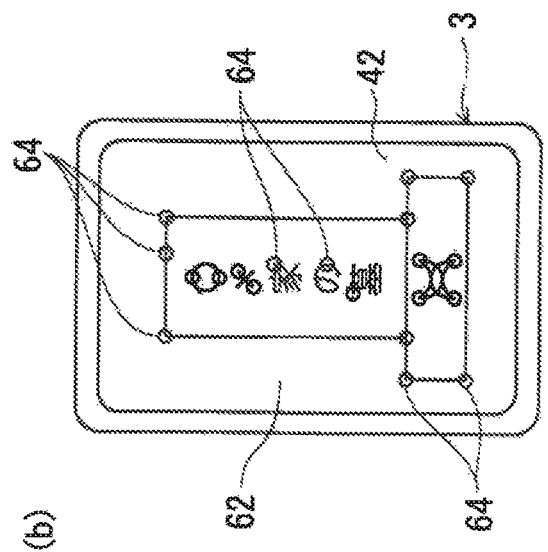

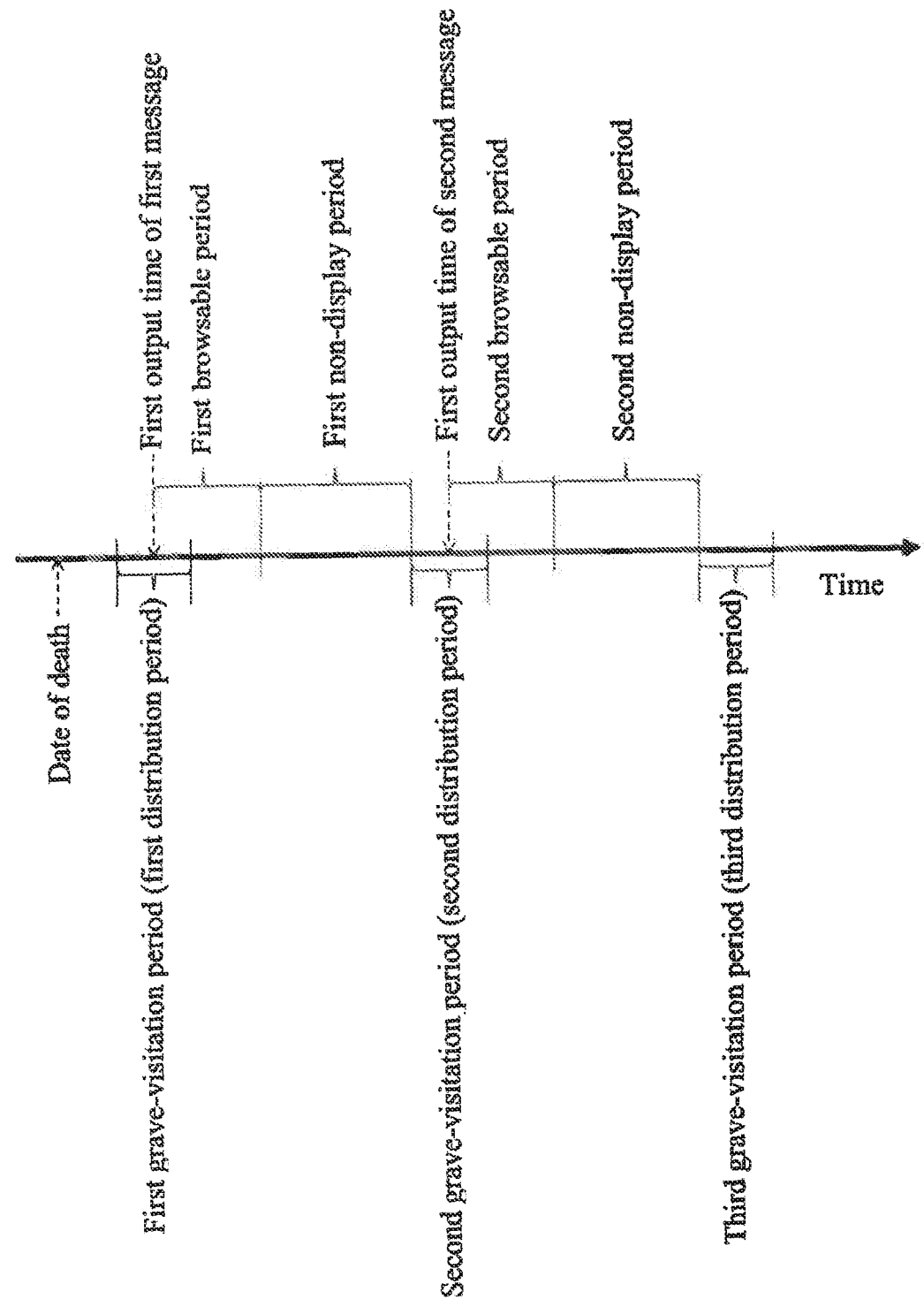

FIG.5

| Data classification | Data example |
|---|---|
| 51 — Deceased ID (deceased person's identification information) | × × × × × |
| 91 — User ID (user identification information) | × × × × × |
| 93 — User name | Hanako YAMADA |

← 15

| Data classification | Data example |
|---|---|
| 91 — User ID (user identification information) | × × × × × |
| 102 — First message output information | year, month, day hour, minute |
| 103 — Second message output information | year, month, day hour, minute |

← 17

| Data classification | Data example |
|---|---|
| 51 — Deceased ID (deceased person's identification information) | × × × × × |
| 111 — First message destination identification information | User ID (× × × × ×) |
| 112 — Second message destination identification information | User ID (× × × × ×) |
| 113 — Third message destination identification information | User ID (× × × × ×) |

| Data classification | Data example |
|---|---|
| Deceased ID (deceased person's identification information) | × × × × × × |
| Second pre-notification message ID | × × × × × × |
| Second pre-notification message | |
| Third pre-notification message ID | × × × × × × |
| Third pre-notification message | |

FIG.13

| Data classification | Data example |
|---|---|
| 51 — Deceased ID (deceased person's identification information) | × × × × × |
| 91 — User ID (user identification information) | × × × × × |
| 341 — Grave-visitation history information 1 | year, month, day, hour, minute |
| Grave-visitation history information 2 | year, month, day, hour, minute |
| Grave-visitation history information 3 | year, month, day, hour, minute |
| ⋮ | |

| Data classification | Data example |
|---|---|
| Deceased ID (deceased person's identification information) | × × × × × × |
| User ID (user identification information) | × × × × × |
| User name | Hanako YAMADA |
| Family relationship information | Grandchild |

MESSAGE DISPLAY APPARATUS, A MESSAGE DISPLAY METHOD, AND A MESSAGE DISPLAY PROGRAM

TECHNICAL FIELD

The present invention relates to a message display apparatus, a message display method, and a message display program. The present invention more specifically relates to an apparatus, method, and program for displaying the messages of a deceased person.

BACKGROUND ART

Conventionally, a system is known for delivering a message, which a certain person left during his/her lifetime, to another person after the death of the person (for example, Patent Document 1). For example, a message which a deceased person left during his/her lifetime may be saved as electronic information. As one example, a system is known in which a message which a certain person left is stored and managed in an information processing apparatus, and a predetermined receiver of the message is notified of the message stored and managed based on a predetermined procedure once the person has died.

PRIOR ART DOCUMENTS

Patent Document

Patent Document 1: JP 2014-229292 A

SUMMARY OF THE INVENTION

Problems to be Solved by the Invention

However, in addition to requests to leave a message after death, there are also requests to deliver messages at a site suitable for remembering the deceased, for example, in front of a grave. Moreover, there are also requests regarding the deceased person's desire to have persons to whom a message has been left continuously visit the grave.

In contrast, when a message display apparatus is attached or juxtaposed onto a grave in order to deliver the message at the grave, it is problematically unsuitable for the sacred site of the grave. Moreover, because graves are often outdoors, wind and rain presumably deteriorate the message display apparatus.

In light of the foregoing, the object of the present invention is to provide a message display apparatus for delivering messages to grave visitors without attaching or juxtaposing a display apparatus onto the grave, in addition to encouraging persons to whom a message has been left to visit the grave.

Means for Solving the Problems

The message display apparatus disclosed in the present application is a message display apparatus for displaying messages of a deceased person on a mobile terminal of a user, and includes: a communication unit for receiving image information of a gravestone transmitted from the mobile terminal along with position information of the mobile terminal; a deceased person specification unit for specifying a deceased person's identification information if the image information of the gravestone received by the communication unit corresponds with the pre-stored image information of the gravestone, and the position information of the mobile terminal received by the communication unit corresponds with the pre-stored position information of the gravestone, wherein the deceased person's identification information identifys the deceased and is associated with the pre-stored image information of the gravestone along with the pre-stored position information of the gravestone; a first message output unit for outputting and displaying a first message on the mobile terminal, wherein the first message is associated with the deceased person's identification information specified by the deceased person specification unit, and pre-stored; a browsing control unit for controlling the first message so as to be unbrowsable in the mobile terminal for a predetermined period after a browsable period has elapsed, based on pre-stored browsable period information showing the browsable period of the first message, and controlling the first message so as to be browsable if the communication unit receives the image information of the gravestone along with the position information of the mobile terminal after the predetermined period has elapsed; and a second message output unit for outputting and displaying a second message on the mobile terminal, wherein the second message is associated with the deceased person's identification information specified by the deceased person specification unit, and pre-stored, if the communication unit receives the image information of the gravestone along with the position information of the mobile terminal after the predetermined period has elapsed.

Effects of the Invention

The message display apparatus disclosed in the present application can deliver messages to grave visitors without attaching or juxtaposing a display apparatus onto the grave, and encourage persons to whom a message has been left to visit the grave.

BRIEF DESCRIPTION OF THE DRAWINGS

FIG. 1 is a functional block diagram of a message display apparatus according to a message display apparatus according to Embodiment 1.

FIG. 2 is a data configuration diagram of deceased person information storage unit, a message storage unit, and a period information storage unit according to Embodiment 1.

FIG. 3(*a*) is the front view of a gravestone. FIG. 3(*b*) is an explanatory view illustrating an imaged image of the gravestone photographed in a mobile terminal. FIG. 3(*c*) is an explanatory view illustrating a first message displayed on the mobile terminal.

FIG. 4 is an explanatory view illustrating each period in Embodiment 1.

FIG. 5 is a data configuration diagram of a user information storage unit, a message output information storage unit, and a destination identification information storage unit according to Embodiment 1.

FIG. 10 is a data configuration diagram of a pre-notification message storage unit according to Embodiment 2.

FIG. 13 is a data configuration diagram of a grave-visitation history information storage unit according to Embodiment 3.

FIG. 16 is a data configuration diagram of a user information storage unit according to Embodiment 4.

MODE FOR CARRYING OUT THE INVENTION

Embodiment 1

Figure 6:
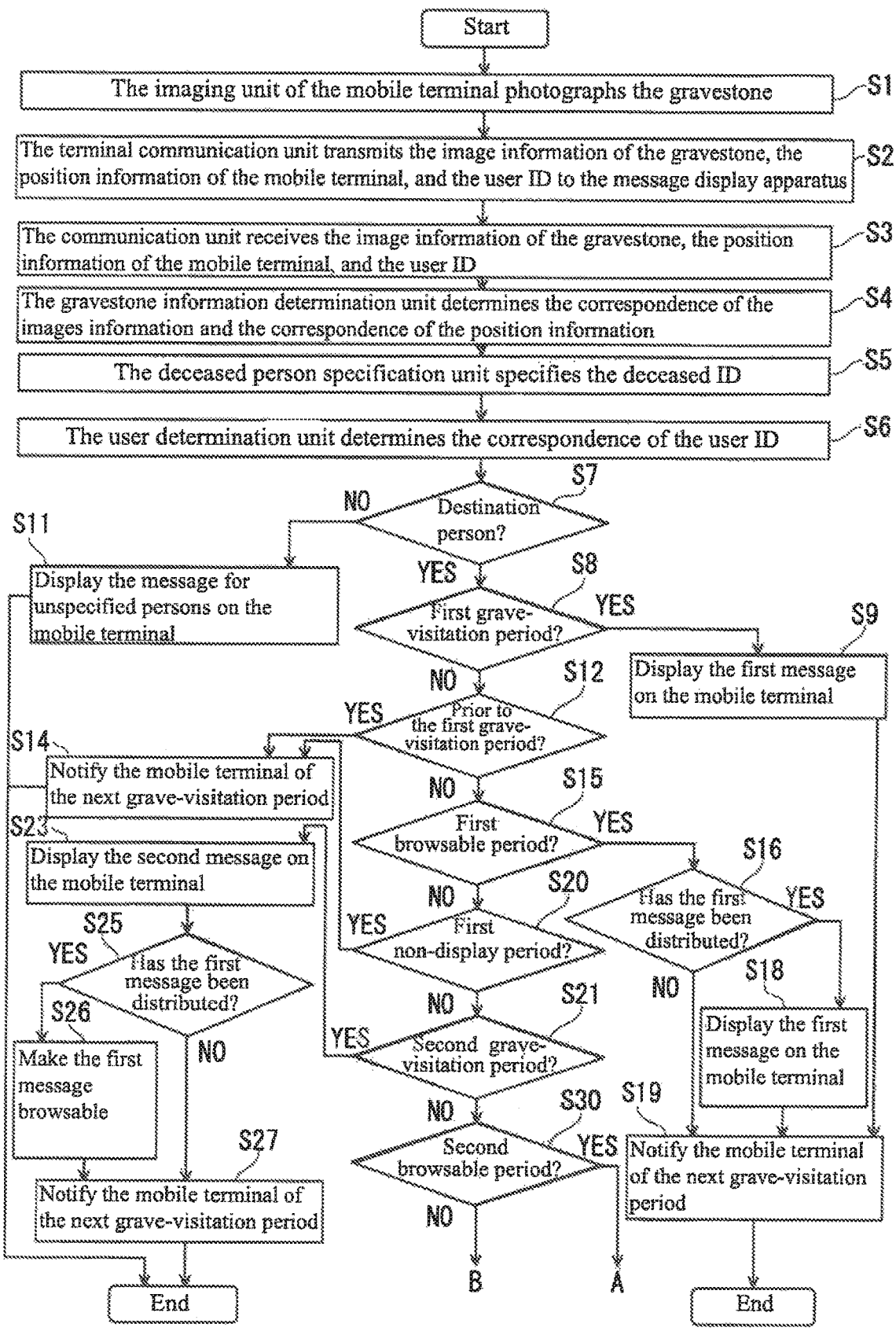
FIG. 6 is a flowchart illustrating the operation of the message display apparatus according to Embodiment 1.

Hereinafter, embodiments of the present invention will be described with reference to the appended figures.

FIG. 1 is a functional block diagram of message display apparatus 1 according to Embodiment 1. Message display apparatus 1, for example, is achieved by a computer functioning as a server. Message display apparatus 1 is configured so as to be communicatable with mobile terminal 3 of a user via communication network 2.

Moreover, message display apparatus 1 includes storage unit 5 for storing various information, control unit 6 for controlling the overall apparatus, communication unit 7 for communication, and input unit 8 for accepting external input via an input means.

Storage unit 5, for example, is achieved by a storage means such as a hard disk, main memory, flash memory, or other various memory, so as to store various programs, various data, etc.

Storage unit 5 includes deceased person information storage unit 11 for storing information regarding a deceased person, message storage unit 12, period information storage unit 14 for storing information regarding various periods, and user information storage unit 15 for storing information regarding the user. Moreover, storage unit 5 includes message output information storage unit 17 for storing information regarding the output of various messages, as well as destination identification information storage unit 18 for storing information regarding the destination of the messages.

As illustrated in FIG. 2, deceased person information storage unit 11 stores a deceased person's identification information for identifying the deceased. The deceased person's identification information is, for example, deceased ID 51 for identifying the deceased, configured by numbers, characters, symbols, etc. Note that in the following description, other identification information including the word "ID" is also configured by numbers, characters, symbols, etc.

Moreover, deceased person information storage unit 11 stores the full name of the deceased (for example, "Taro YAMADA") as deceased name 52.

In addition, deceased person information storage unit 11 stores image information 54 of a gravestone along with position information 55 of the gravestone. Here, the above-mentioned gravestone is the gravestone of the deceased identified by deceased ID 51.

In this embodiment, image information 54 of the gravestone is the data of photographic images obtained by photographing the gravestone. Images used as image information 54 of the gravestone, for example, as illustrated in FIG. 3(a), are photographic images when viewed from the front of gravestone 60 and are desirably images photographed so as to include characteristics which distinguish gravestone 60 from other gravestones 60, such as characters 60a and family crest 60b engraved in gravestone 60, as well as contour 60c of gravestone 60.

Note that image information 54 of gravestone 60 may be data obtained by extracting information on the characteristic points for image matching from the data of the photographic images of gravestone 60. Position information 55 of the gravestone is information showing the position of gravestone 60, for example, position information specified by GPS (Global Positioning System).

Message storage unit 12 stores messages which the deceased left during his/her lifetime. As illustrated in FIG. 2, in this embodiment, first message 72, second message 74, third message 77, and message 79 for unspecified persons are each stored in moving images. These moving images, for example, as illustrated in FIG. 3(c), are moving images taken of the deceased person 67 reciting messages during his/her lifetime.

In this embodiment, first message 72, second message 74, and third message 77 are each messages for specific users, while message 79 for unspecified persons is a message for unspecified users.

This message 79 for unspecified persons may be, for example, moving images of deceased person 67 reciting a general message such as "Thank you for visiting my grave," or may be moving images of deceased person 67 reciting personal messages to multiple bereaved persons.

Moreover, message ID for identifying each message is stored as message identification information. In this embodiment, message storage unit 12 stores: first message ID 71 which is associated with first message 72 and identifies first message 72; second message ID73 which is associated with first message 72 and identifies second message 74; third message ID76 which is associated with third message 77 and identifies third message 77; and message ID78 for unspecified persons which is associated with message 79 for unspecified persons and identifies message 79 for unspecified persons. Various messages and message IDs stored in message storage unit 12 are associated with deceased IDs (deceased person's identification information) 51 in order to identify which deceased person 67 these messages are from.

Period information storage unit 14 stores period information regarding the distribution or browsing of various messages. As illustrated in FIG. 4, in this embodiment, various periods are set based on the date of death of deceased person 67. Various messages from deceased person 67 are distributed to mobile terminal 3 during grave visitations. The first grave-visitation period is the first distribution period. The first distribution period is the period in which first message 72 is distributed. The second grave-visitation period is the second distribution period. The second distribution period is the period in which second message 74 is distributed. The third grave-visitation period is the third distribution period. The third distribution period is the period in which third message 77 is distributed.

The first browsable period is the browsable period of first message 72. In this embodiment, it is within a predetermined period from the time point at which first message 72 is first output on mobile terminal 3. The first message non-display period is the period in which first message 72 is not displayed, that is, the unbrowsable period of first message 72. In this example, the first message non-display period is the period from the time point at which the first browsable period finishes to the time point at which the second grave-visitation period starts. That is, the first non-display period shows the period after the browsable period of first message 72 has elapsed.

The second browsable period is the browsable period of second message 74. In this embodiment, it is within a predetermined period from the time point at which second message 74 was first output on mobile terminal 3. The second message non-display period is the period in which second message 74 is not displayed, that is, the unbrowsable period of second message 74. In this example, the second message non-display period is the period from the time point at which the second browsable period finishes to the time point at which the third grave-visitation period starts. That is, the second non-display period shows the period after the browsable period of second message 74 has elapsed.

Period information storage unit 14, as illustrated in FIG. 2, stores date of death information 82 showing the date of death of deceased person 67, first grave-visitation period information 83 showing the first grave-visitation period, first browsable period information 84 showing the first browsable period, and first non-display period information 85 showing the first non-display period. Moreover, period information storage unit 14 stores second grave-visitation period information 86 showing the second grave-visitation period, second browsable period information 87 showing the second browsable period, second non-display period information 88 showing the second non-display period, and third grave-visitation period information 89 showing the third grave-visitation period. Date of death information 82, for example, is stored as information regarding the date on which deceased person 67 died. Information of various periods, for example, is stored as data of the date and time showing the start time point of the period and the finish time point of the period. Date of death information 82 and the information of various periods are associated with deceased ID (deceased person's identification information) 51.

As illustrated in FIG. 5, user information storage unit 15 stores user identification information for identifying a user. The user identification information, for example, is user ID 91 for identifying the user. Moreover, user information storage unit 15 stores the full name of the user (for example, "Hanako YAMADA") as user name 93. User ID (user identification information) 91 is associated with deceased ID 51.

Message output information storage unit 17 stores information showing whether various messages have been output on mobile terminal 3. In this embodiment, the date and time when various messages were first output is stored. Messages for which the date and time are not stored will not be output on mobile terminal 3. In this case, the fact that the date and time are not stored may show that messages are not output, or other data shown as not output may be stored.

The time point shown by first message output information 102 is the first output time of first message 72 illustrated in FIG. 4, while the time point shown by second message output information 103 is the first output time of second message 74.

Destination identification information storage unit 18 stores destination identification information showing the destination persons of various messages. The destination person is the person designated by deceased person 67 as the receiver of a message and specified by user ID 91. In this embodiment, destination identification information storage unit 18 stores destination identification information 111 of first message 72, destination identification information 112 of second message 74, and destination identification information 113 of third message 77. Destination identification information storage unit 18 stores user ID 91 for specifying the user, who is the destination person, as each piece of destination identification information.

In this embodiment, it is assumed that the destination person of first message 72, second message 74, and the third message is the same person. Accordingly, user ID 91 stored as destination identification information 111, 112, 113 is the same user ID 91.

Control unit 6 (FIG. 1), for example, is achieved by a computing means such as a processor or CPU, and cooperates with a storage means such as various memory or hard disks, functions, and executes various programs.

Control unit 6 includes: main control unit 21; gravestone information determination unit 22 for making a determination regarding image information 54 and position information 55 of gravestone 60; deceased person specification unit 23 for specifying deceased ID (deceased person's identification information) 51; user determination unit 25 for determining whether pre-stored user ID (user identification information) 91 corresponds with user ID 91 received by communication unit 7; period determination unit 26 for determining various periods; and destination determination unit 27 for determining the destination persons of various messages.

Moreover, control unit 6 includes: first message output unit 29 for outputting first message 72 on mobile terminal 3; browsing control unit 31 for controlling browsing of first message 72 along with browsing of second message 74; second message output unit 32 for outputting second message 74 on mobile terminal 3; third message output unit 33 for outputting third message 77 on mobile terminal 3; and message output unit 34 for unspecified persons for outputting message 79 for unspecified persons on mobile terminal 3.

Main control unit 21 executes various programs and controls various configuration units, in addition to controlling the overall apparatus.

Gravestone information determination unit 22 determines whether the image information of gravestone 60 received by communication unit 7 corresponds with image information 54 of gravestone 60 pre-stored in deceased person information storage unit 11. Note that in this example, the image information of gravestone 60 received by communication unit 7, as illustrated in FIG. 3(b), is image data of photographic image 62 of gravestone 60 photographed by mobile terminal 3 during a grave visitation of the user.

Moreover, gravestone information determination unit 22 determines whether the position information of mobile terminal 3 received by communication unit 7 corresponds with position information 55 of gravestone 60 pre-stored in deceased person information storage unit 11.

If gravestone information determination unit 22 determines that the image information (photographic image 62) of gravestone 60 received by communication unit 7 corresponds with pre-stored image information 54 of gravestone 60 and determines that the position information of mobile terminal 3 received by communication unit 7 corresponds with pre-stored position information 55 of gravestone 60, deceased person specification unit 23 specifies deceased ID 51 which is associated with image information 54 of gravestone 60 along with position information 55 of gravestone 60.

User determination unit 25 determines whether user ID 91 pre-stored in user information storage unit 15 corresponds with user ID 91 received by communication unit 7.

Based on the information of various periods stored in period information storage unit 14, period determination unit 26 determines to which period a reception time (hereinafter, referred to as a "communication unit reception time") in which communication unit 7 received image information (photographic image 62) of gravestone 60, the position information of mobile terminal 3, and user ID 91 corresponds.

Destination determination unit 27 compares user ID 91 received by communication unit 7 with destination identification information 111 pre-stored in destination identification information storage unit 18 and determines whether user ID 91 corresponds with destination identification information 111.

If period determination unit 26 determines that the abovementioned communication unit reception time is within the first grave-visitation period (first distribution period), first message output unit 29 outputs and displays first message 72 on mobile terminal 3.

Browsing control unit 31 controls first message 72 so as to be unbrowsable for a predetermined period in mobile terminal 3 after the first browsable period has elapsed, based on first browsable period information 84, and controls first message 72 so as to be browsable, if communication unit 7 receives image information (photographic image 62) of gravestone 60 along with the position information of mobile terminal 3 after the predetermined period has elapsed. Note that, in this embodiment, the predetermined unbrowsable period of first message 72 is the first non-display period shown by first non-display period information 85.

Moreover, browsing control unit 31 controls second message 74 so as to be unbrowsable for a predetermined period in mobile terminal 3 after the second browsable period has elapsed, based on second browsable period information 87, and controls second message 74 so as to be browsable, if communication unit 7 receives image information (photographic image 62) of gravestone 60 along with the position information of mobile terminal 3 after the predetermined period has elapsed. Note that, in this embodiment, the predetermined unbrowsable period of second message 74 is the second non-display period shown by second non-display period information 88.

If period determination unit 26 determines that the abovementioned communication unit reception time is within the second grave-visitation period (second distribution period), second message output unit 32 outputs and displays second message 74 on mobile terminal 3.

If period determination unit 26 determines that the abovementioned communication unit reception time is within the third grave-visitation period (third distribution period), third message output unit 33 outputs and displays third message 77 on mobile terminal 3.

Message output unit 34 for unspecified persons outputs and displays message 79 for unspecified persons on mobile terminal 3.

Communication unit 7 (FIG. 1), via communication network 2, transmits various data, information, etc. to mobile terminal 3 and receives various data, information, etc. from mobile terminal 3.

Input unit 8 inputs external data, etc. to message display apparatus 1 using various input means such as a keyboard and mouse.

Moreover, message display apparatus 1 includes a time information provision means such as a hardware clock or system clock and is configured so as to obtain the current time or various other times.

Mobile terminal 3 is a portable terminal, for example, a smartphone, mobile telephone, tablet or other computer, etc. Mobile terminal 3 includes imaging unit 41, display unit 42, position detection unit 43, operation unit 45, terminal control unit 46, terminal communication unit 47, and terminal storage unit 49. Imaging unit 41 is a camera unit having an imaging function. Display unit 42 includes a display screen such as a liquid crystal display or an organic EL display, and displays various moving images, image, data, information, etc. on the display screen. Position detection unit 43 has a GPS function, obtaining the current position information of mobile terminal 3.

Operation unit 45, for example, is configured by a keyboard, mouse, touchpad, button, etc., and inputs, on mobile terminal 3, various information along with instructions from the user. Terminal control unit 46 executes various programs and controls various configuration units in mobile terminal 3, in addition to controlling overall mobile terminal 3.

Terminal communication unit 47, via communication network 2, transmits various data, information, etc. to message display apparatus 1 and receives various data, information, etc. from message display apparatus 1.

Terminal storage unit 49, for example, is achieved by a storage means such as a main memory, flash memory, main body storage, or other various memory, so as to store various programs, various data, etc.

Next, the operation of message display apparatus 1 will be described.

<Pre-Registration Process>

First, the pre-registration process executed during the lifetime of deceased person 67 will be described. Note that it is assumed in this example that during his/her lifetime, a deceased person or user registers various messages and other information in message display apparatus 1 using a mobile terminal or other computers. In accordance with the input of the deceased or user during his/her lifetime, the abovementioned mobile terminal or other computers (hereinafter, referred to as a "terminal for pre-registration") transmits various messages and other information to message display apparatus 1.

In the pre-registration process, communication unit 7 receives deceased name 52, image information 54 of gravestone 60, and position information 55 of gravestone 60 from the abovementioned terminal for pre-registration, and inputs them in message display apparatus 1. Main control unit 21 stores deceased name 52 received by communication unit 7, image information 54 of the gravestone, and position information 55 of the gravestone in deceased person information storage unit 11. Moreover, main control unit 21 assigns deceased ID (deceased person's identification information) 51 for uniquely identifying deceased person 67 to the deceased, and stores deceased ID 51 in deceased person information storage unit 11.

Moreover, communication unit 7 receives various messages, which deceased person 67 left to bereaved persons during his/her lifetime, from the abovementioned terminal for pre-registration and inputs them in message display apparatus 1. In this embodiment, first message 72, second message 74, third message 77, and message 79 for unspecified persons are input in message display apparatus 1. Main control unit 21 stores, in message storage unit 12, first message 72, second message 74, third message 77, and message 79 for unspecified persons, which were received by communication unit 7. Moreover, main control unit 21 assigns message ID (message identification information) for uniquely identifying various messages to each message, and stores each message ID in message storage unit 12. In this example, first message ID 71 for identifying first message 72, second message ID73 for identifying second message 74, third message ID76 for identifying third message 77, and message ID78 for unspecified persons for identifying message 79 for unspecified persons are stored in message storage unit 12.

In addition, communication unit 7 receives period setting information (not illustrated) regarding the first grave-visitation period, the first browsable period, the second grave-visitation period, the second browsable period, and the third grave-visitation period from the abovementioned terminal for pre-registration, and inputs the information in message display apparatus 1. The period setting information is information regarding the length and base date of each period. In this embodiment, as one example, the period setting information of the first grave-visitation period is "one month before or after the forty-ninth day after death," the period setting information of the first browsable period is "one month from the first output time of the first message," the period setting information of the second grave-visitation period is "one month before or after the first anniversary of death," the period setting information of the second browsable period is "one month from the first output time of the second message," and the period setting information of the third grave-visitation period is "one month before or after the second anniversary of death."

Main control unit 21 stores the period setting information received by communication unit 7 in period information storage unit 14. This period setting information is set in accordance with the living will of deceased person 67.

Moreover, after deceased person 67 dies, communication unit 7 receives date of death information 82 from the abovementioned terminal for pre-registration and inputs it in message display apparatus 1. Main control unit 21 stores date of death information 82 received by communication unit 7 in period information storage unit 14. In accordance with the period setting information exemplified above, if date of death information 82 is input, the specific periods of the first grave-visitation period, the second grave-visitation period, and the third grave-visitation period, which are set based on the date of death, are decided. Main control unit 21 calculates first grave-visitation period information 83, second grave-visitation period information 86, and third grave-visitation period information 89 based on the period setting information and date of death information 82, and stores them in period information storage unit 14.

As mentioned above, if the start time of the first browsable period is the first output time of the first message, until the first output time of the first message is decided, main control unit 21 sets the finish time of the first grave-visitation period to the start time of the first browsable period as the initial setting. Similarly, if the start time of the second browsable period is the first output time of the second message, until the first output time of the second message is decided, main control unit 21 sets the finish time of the second grave-visitation period to the start time of the second browsable period as the initial setting.

Main control unit 21 calculates the periods of the initial setting of first browsable period information 84 and second browsable period information 87 based on first grave-visitation period information 83 and second grave-visitation period information 86, and stores them in period information storage unit 14.

In this embodiment, the first non-display period is set to the period from the finish time of the first browsable period until the start time of the second grave-visitation period. Moreover, the second non-display period is set to the period from the finish time of the second browsable period until the start time of the third grave-visitation period. Main control unit 21 calculates first non-display period information 85 and second non-display period information 88 based on the abovementioned calculated first grave-visitation period information 83, first browsable period information 84, second grave-visitation period information 86, second browsable period information 87, and third grave-visitation period information 89, and stores them in period information storage unit 14.

Moreover, communication unit 7 receives user name 93 from the abovementioned terminal for pre-registration and inputs it in message display apparatus 1. User name 93, for example, is the name of a user who deceased person 67 wanted to visit their grave or a user to whom deceased person 67 wished to leave a message, and is set in accordance with the living will of deceased person 67. Main control unit 21 stores user name 93 in user information storage unit 15. In addition, main control unit 21 assigns user ID 91 for uniquely identifying a user to the user, and stores user ID 91 in user information storage unit 15. Note that user ID 91 associated with one deceased ID 51 may be one or multiple.

If user ID 91 is stored in user information storage unit 15, main control unit 21 outputs and displays user ID 91 corresponding to user name 93 on the abovementioned terminal for pre-registration. User ID 91 thus issued is pre-distributed to each user by the deceased or user during his/her lifetime who executed the pre-registration process.

Using user ID 91, each user who received user ID 91 authenticates, in message display apparatus 1, mobile terminal 3 which communicates with message display apparatus 1 in order to receive a message from the deceased. For example, the configuration may be such that dedicated application software for transmitting and receiving various data with message display apparatus 1 can be installed in terminal storage unit 49, and via the installed application software, mobile terminal 3 can be authenticated in message display apparatus 1, and notifications, etc. from message display apparatus 1 can be received.

Moreover, various information, etc. (not illustrated) necessary for communication such as the telephone number and push notification of mobile terminal 3 which communicates with message display apparatus 1 may be pre-stored in user information storage unit 15 of message display apparatus 1. At this time, main control unit 21 may be configured to store, in user information storage unit 15, the telephone number, various information, etc. of mobile terminal 3 received by communication unit 7 from mobile terminal 3 or other terminals.

Further, communication unit 7 receives user name 93 showing the destination person of first message 72, second message 74, and third message 77 from the abovementioned terminal for pre-registration, and inputs it in message display apparatus 1. Main control unit 21 stores user ID 91 for identifying user name 93 received by communication unit 7 in destination identification information storage unit 18 as destination identification information 111, 112, 113. As mentioned above, in this embodiment, because the destination person of first message 72, second message 74, and third message 77 is the same person, the same user ID 91 is input.

Note that the abovementioned various data input in display apparatus 1 may be input via input unit 8 or may be input by the manager of message display apparatus 1.

<Process During Grave Visitations>

Figure 7:
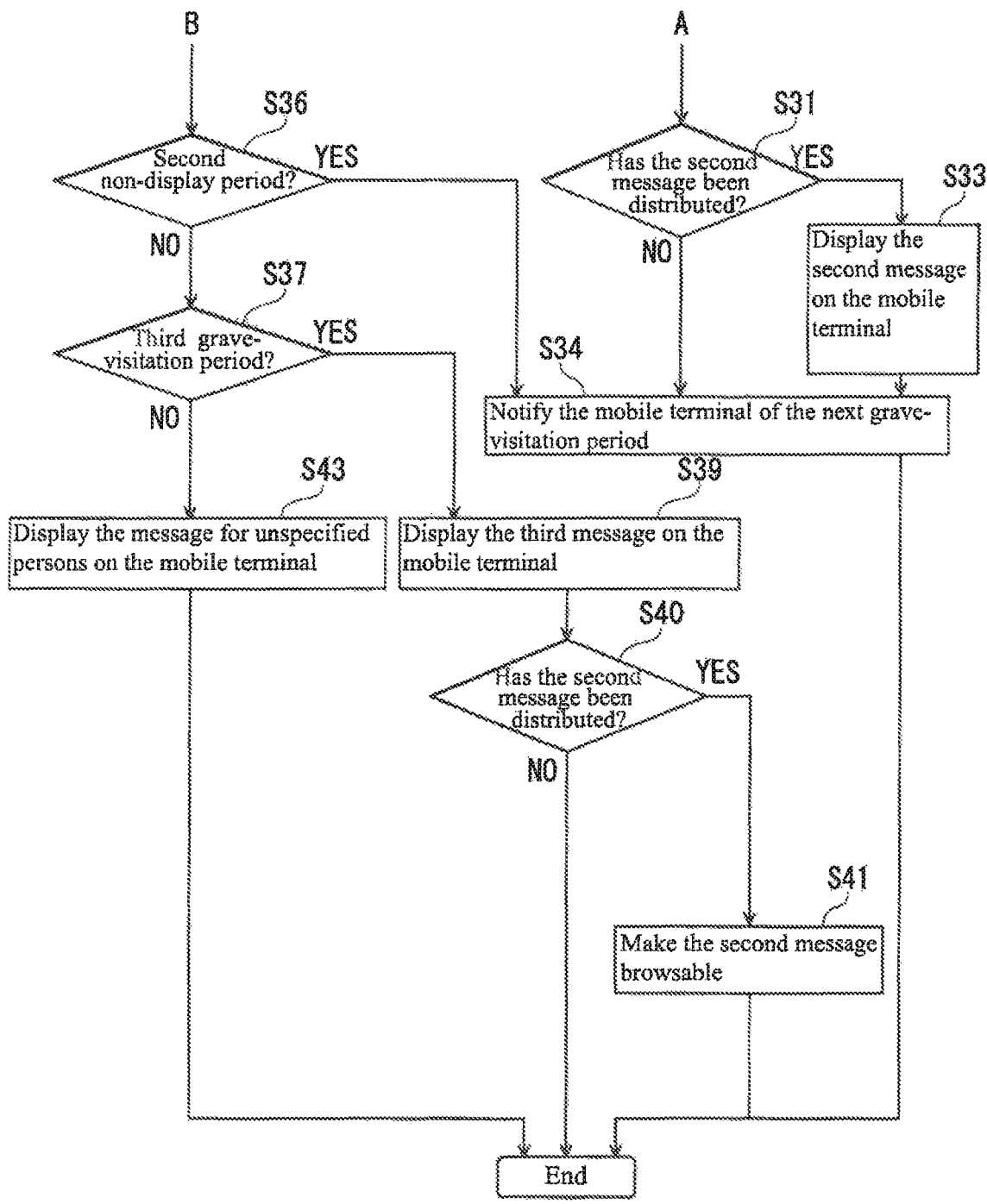
FIG. 7 is a flowchart illustrating the operation of the message display apparatus according to Embodiment 1.

Next, the process of message display apparatus 1 during grave visitations of a user will be described. Flowcharts illustrating the flow of the process during grave visitations are illustrated in FIG. 6 and FIG. 7. As illustrated in FIG. 3(b), users who visited a grave photograph gravestone 60 of deceased person 67 from the front thereof using mobile terminal 3. That is, imaging unit 41 of mobile terminal 3 photographs gravestone 60 and obtains photographic image 62 of gravestone 60 as the image information of gravestone 60 (Step 1). Moreover, position detection unit 43 of mobile terminal 3 obtains position information showing the current position of this mobile terminal 3.

Subsequently, in accordance with the operation of the user via operation unit 45, terminal communication unit 47 transmits, to message display apparatus 1, the image information of gravestone 60 obtained in Step 1, the abovementioned position information of mobile terminal 3 obtained by position detection unit 43, and user ID 91 (Step 2). In this embodiment, as the image information of gravestone 60, image data of photographic image 62 is transmitted. Moreover, because the user photographs gravestone 60 using mobile terminal 3 in front of gravestone 60, the position information of mobile terminal 3 will show the position of gravestone 60. As mentioned above, user ID 91 is pre-distributed to the user.

Subsequently, communication unit 7 receives image information (photographic image 62) of gravestone 60, the position information of mobile terminal 3, and user ID 91, which was transmitted in Step 2 (Step 3).

Gravestone information determination unit 22 determines whether image information (photographic image 62) of gravestone 60 and the position information of mobile terminal 3, which were received by communication unit 7 in Step 3, corresponds with pre-stored image information 54 and position information 55 of gravestone 60 (Step 4).

In Step 4, gravestone information determination unit 22 reads image information 54 of gravestone 60 pre-stored in deceased person information storage unit 11 and determines whether read image information 54 corresponds with image information (photographic image 62) of gravestone 60 received by communication unit 7. The correspondence with the image information is determined, for example, by image matching using information of the characteristic points of the image.

In photographic image 62 of FIG. 3(b), the points shown by multiple small circles are characteristic points 64 for image matching. Note that characteristic points 64 are illustrated for descriptive purposes and not displayed on display unit 42.

As one example, characteristic points 64 are extracted from edges and corners, which are the points having a strong gradation change in images. For example, in characters 60a and family crest 60b engraved in gravestone 60, as well as contour 60c of gravestone 60, characteristic points 64 tend to be extracted.

Gravestone information determination unit 22 extracts each characteristic point 64 of the image from image information 54 read from deceased person information storage unit 11 and image information (photographic image 62) received by communication unit 7, compares the information of characteristic points 64 of both images, and thereby determines whether image information 54 read from deceased person information storage unit 11 corresponds with image information (photographic image 62) received by communication unit 7. Note that the correspondence here includes an acceptable error range.

Moreover, while gravestone information determination unit 22 extracts characteristic points 64 of the images from image information (photographic image 62) received by communication unit 7 in this embodiment, it may pre-extract characteristic points 64 from photographic image 62 by terminal control unit 46. In this case, terminal communication unit 47 may transmit information of characteristic points 64 of the extracted images as the image information of gravestone 60 to message display apparatus 1. Moreover, as mentioned above, image information 54 of gravestone 60 stored in deceased person information storage unit 11 may be data obtained by extracting information of characteristic points 64 for image matching from the image data of photographed gravestone 60. Accordingly, gravestone information determination unit 22 may compare information of characteristic points 64 of the images received by communication unit 7 with information of characteristic points 64 of the images pre-stored in deceased person information storage unit 11, and determine the correspondence of both.

Moreover, in Step 4, gravestone information determination unit 22 reads position information 55 of gravestone 60 pre-stored in deceased person information storage unit 11, and determines whether read position information 55 corresponds with the position information of mobile terminal 3 received by communication unit 7. Note that the correspondence here includes an acceptable error range. For example, if the position information is obtained using GPS, a certain error range in width (as one example, approximately 10 m) is set as acceptable taking the precision of GPS into consideration.

In Step 4, if gravestone information determination unit 22 determines that the image information (photographic image 62) of gravestone 60 received by communication unit 7 corresponds with pre-stored image information 54 of gravestone 60 and determines that the position information of mobile terminal 3 received by communication unit 7 corresponds with pre-stored position information 55 of gravestone 60, deceased person specification unit 23 specifies deceased ID (deceased person's identification information) 51 which is associated with pre-stored image information 54 of gravestone 60 along with pre-stored position information 55 of gravestone 60 (Step 5).

Deceased person specification unit 23 extracts deceased ID 51 which is associated with image information 54 of gravestone 60 and position information 55 of gravestone 60, which were determined to correspond as mentioned above, from deceased ID 51 stored in deceased person information storage unit 11, and specifies deceased ID 51. Consequently, which deceased person 67 gravestone 60 photographed by mobile terminal 3 belongs to will be specified.

If gravestone information determination unit 22 determines that at least one of image information 54 of gravestone 60 and position information 55 of gravestone 60 does not correspond, the abovementioned deceased ID 51 is not extracted, and deceased ID 51 is not specified.

If deceased person specification unit 23 specifies deceased ID 51 in Step 5, user determination unit 25 determines whether user ID (user identification information) 91 associated with specified deceased ID 51 corresponds with user ID 91 received by communication unit 7 (Step 6). If user determination unit 25 determines that user ID 91 associated with deceased ID 51 does not correspond with user ID 91 received by communication unit 7, the process after Step 7 is not executed. Note that the case in which it does not correspond with user ID 91 received by communication unit 7 includes the case in which communication unit 7 has not received user ID 91 and there is no user ID, which is a comparison object.

In Step 6, if user determination unit 25 determines that user ID 91 associated with deceased ID 51 corresponds with user ID received by communication unit 7, destination determination unit 27 determines whether destination identification information 111 corresponds with user ID received by communication unit 7 in Step 3 (Step 7).

Destination determination unit 27 reads first destination identification information 111 from destination identification information storage unit 18 and determines whether user ID 91 shown by destination identification information 111 corresponds with user ID 91 received by communication unit 7. In the case of correspondence, determination unit 27 will determine that the user identified by user ID 91 received by communication unit 7 is the destination person of the first message.

Note that in this embodiment, because the destination person of first message 72, second message 74, and third message 77 is the same person, if destination determination unit 27 determines that the user is the destination person of first message 72, it will also determine that the destination person of second message 74 and the destination person of third message 77 are also this user.

In Step 7, if destination determination unit 27 determines that user ID 91 shown by destination identification information 111 corresponds with user ID 91 received by communication unit 7, period determination unit 26 determines whether the reception time (communication unit reception time) in which communication unit 7 received image information of gravestone 60 (photographic image 62), the position information of mobile terminal 3, and user ID 91 is within the first grave-visitation period (Step 8). Period determination unit 26 reads first grave-visitation period information 83 from period information storage unit 14 and determines whether the communication unit reception time is within the first distribution period shown by first grave-visitation period information 83.

In Step 8, if period determination unit 26 determines that the communication unit reception time is within the first grave-visitation period, first message output unit 29 outputs and displays first message 72 on mobile terminal 3 (Step 9). Here, first message output unit 29 reads first message 72 from message storage unit 12, outputs read first message 72 on mobile terminal 3 via communication unit 7, and as illustrated in FIG. 3(*c*), displays it on a display screen of display unit 42.

Note that the output system of various messages such as first message 72, second message 74, and third message 77 may be streaming distribution in which various messages output on mobile terminal 3 are not saved on mobile terminal 3, or may be download distribution in which various messages output on mobile terminal 3 are saved on mobile terminal 3. In this embodiment, an example of the abovementioned streaming distribution will be described.

Moreover, first message output unit 29 also outputs first message ID 71 for identifying first message 72 on mobile terminal 3. Terminal control unit 46 stores first message ID 71 in terminal storage unit 49.

Moreover, if first message output unit 29 has first output first message 72 on mobile terminal 3, main control unit 21 stores, in message output information storage unit 17, the date and time showing the time point at which first message 72, as first message output information 102, was first output on mobile terminal 3.

In addition, main control unit 21 sets the date and time showing the time point at which first message 72 was first output on mobile terminal 3, to the start time of the first browsable period. That is, main control unit 21 rewrites the start time of the first browsable period shown by first browsable period information 84 stored in period information storage unit 14 to the first output time of first message 72.

Note that if first message 72 has not been output even once within the first grave-visitation period, the start time of the first browsable period is not rewritten but rather left in the initial setting. Moreover, if first message 72 has not been output even once within the first grave-visitation period, the date and time as first message output information 102 is not stored in message output information storage unit 17.

First message output unit 29 can output and display first message 72 on mobile terminal 3 during the first grave-visitation period. If first message 72 has been output on mobile terminal 3 at least once during the first grave-visitation period, it means that the user visited the grave during the first grave-visitation period and received first message 72.

Subsequently, main control unit 21 notifies mobile terminal 3 of the next grave-visitation period, that is, the second grave-visitation period (Step 19). Main control unit 21 reads second grave-visitation period information 86 from period information storage unit 14, outputs the second grave-visitation period on mobile terminal 3, and displays it on the display screen of display unit 42.

Next, a description will be provided returning to Step 7. In Step 7, if destination determination unit 27 determines that user ID 91 shown by destination identification information 111 does not correspond with user ID 91 received by communication unit 7, message output unit 34 for unspecified persons reads message 79 for unspecified persons from message storage unit 12, outputs read message 79 for unspecified persons on mobile terminal 3, and displays it on the display screen of display unit 42 (Step 11).

Moreover, in Step 8, if period determination unit 26 determines that the communication unit reception time is not within the first grave-visitation period, period determination unit 26 determines whether the communication unit reception time is prior to the first grave-visitation period based on first grave-visitation period information 83 (Step 12).

In Step 12, if period determination unit 26 determines that the communication unit reception time is prior to the first grave-visitation period, main control unit 21 notifies mobile terminal 3 of the next grave-visitation period, that is, the first grave-visitation period (Step 14). Main control unit 21 reads first grave-visitation period information 83 from period information storage unit 14, outputs the first grave-visitation period on mobile terminal 3, and displays it on the display screen of display unit 42.

In Step 12, if period determination unit 26 determines that the communication unit reception time is not prior to the first grave-visitation period, period determination unit 26 reads first browsable period information 84 from period information storage unit 14 and determines whether the communication unit reception time is within the first browsable period shown by first browsable period information 84 (Step 15).

In Step 15, if period determination unit 26 determines that the communication unit reception time is within the first browsable period shown by first browsable period information 84, main control unit 21 reads first message output information 102 from message output information storage unit 17 and determines whether first message 72 has been distributed to mobile terminal 3 (Step 16). In the description of the present specification, "has been distributed" means that first message 72 has been output on mobile terminal 3 at least once.

If the date and time showing the time point at which first message 72 was first output on mobile terminal 3 is stored as first message output information 102, main control unit 21 determines that first message 72 has been distributed. In contrast, if the date and time showing the time point at which first message 72 was first output on mobile terminal 3 is not stored as first message output information 102, main control unit 21 determines that first message 72 has not been distributed.

In Step 16, if main control unit 21 determines that first message 72 has been distributed, browsing control unit 31 displays first message 72 on mobile terminal 3 (Step 18). That is, if mobile terminal 3 of the user receives first message 72 during the first grave-visitation period, the user can browse first message 72 in the first browsable period.

Subsequently, main control unit 21 notifies mobile terminal 3 of the next grave-visitation period, that is, the second grave-visitation period (Step 19). Main control unit 21 reads second grave-visitation period information 86 from period information storage unit 14, outputs the second grave-visitation period on mobile terminal 3, and displays it on the display screen of display unit 42.

Moreover, if main control unit 21 determines that first message 72 has not been distributed in Step 16, it proceeds to Step 19 without processing Step 18. That is, if mobile terminal 3 of the user doe not receive first message 72 during the first grave-visitation period, the user cannot browse first message 72 after the first grave-visitation period has elapsed.

Next, a description will be provided returning to Step 15.

In Step 15, if period determination unit 26 determines that the communication unit reception time is not within the first browsable period shown by first browsable period information 84, period determination unit 26 reads first non-display period information 85 from period information storage unit 14 and determines whether the communication unit reception time is within the first non-display period shown by first non-display period information 85 (Step 20).

In Step 20, if period determination unit 26 determines that the communication unit reception time is within the first non-display period, main control unit 21 notifies mobile terminal 3 of the next grave-visitation period, that is, the second grave-visitation period (Step 14). If period determination unit 26 determines that the communication unit reception time is within the first non-display period, browsing control unit 31 controls first message 72 so as to be unbrowsable. In the first non-display period, first message 72 is not displayed on mobile terminal 3.

In Step 20, if period determination unit 26 determines that the communication unit reception time is not within the first non-display period, period determination unit 26 reads second grave-visitation period information 86 from period information storage unit 14 and determines whether the communication unit reception time is within the second grave-visitation period shown by second grave-visitation period information 86 (Step 21).

In Step 21, if period determination unit 26 determines that the communication unit reception time is within the second grave-visitation period, second message output unit 32 outputs and displays second message 74 on mobile terminal 3 (Step 23). Here, second message output unit 32 reads second message 74 from message storage unit 12, outputs read second message 74 on mobile terminal 3 via communication unit 7, and displays it on a display screen of display unit 42.

Moreover, second message output unit 32 also outputs second message ID 73 for identifying second message 74 on mobile terminal 3. Terminal control unit 46 stores second message ID 73 in terminal storage unit 49.

Moreover, if second message output unit 32 first has output second message 74 on mobile terminal 3, main control unit 21 stores, in message output information storage unit 17, the date and time showing the time point at which second message 74, as second message output information 103, was first output on mobile terminal 3.

In addition, main control unit 21 sets the date and time showing the time point at which second message 74 was first output on mobile terminal 3, to the start time of the second browsable period. That is, main control unit 21 rewrites the start time of the second browsable period shown by second browsable period information 87 stored in period information storage unit 14 to the first output time of the second message.

Note that if second message 74 has not been output even once within the second grave-visitation period, the start time of the second browsable period is not rewritten but rather left in the initial setting. Moreover, if second message 74 has not been output even once within the second grave-visitation period, the date and time as second message output information 103 is not stored in message output information storage unit 17.

Second message output unit 32 can output and display second message 74 on mobile terminal 3 during the second grave-visitation period. If second message 74 has been output on mobile terminal 3 at least once during the second grave-visitation period, it means that the user visited the grave during the second grave-visitation period and received second message 74.

In Step 23, if second message output unit 32 outputs second message 74, main control unit 21 reads first message output information 102 from message output information storage unit 17 and determines whether first message 72 has been distributed to mobile terminal 3 (Step 25).

As in the process in Step 16, if the date and time showing the time point at which first message 72 was first output on mobile terminal 3 is stored as first message output information 102, main control unit 21 determines that first message 72 has been distributed. In contrast, if the date and time showing the time point at which first message 72 was first output on mobile terminal 3 is not stored as first message output information 102, main control unit 21 determines that the first message has not been distributed.

In Step 25, if main control unit 21 determines that first message 72 has been distributed, browsing control unit 31 controls first message 72 so as to be browsable (Step 26). As mentioned above, in the first non-display period, browsing control unit 31 controls first message 72 so as to be unbrowsable. However, in Step 26, browsing control unit 31 releases the browsing limitation so as to make first message 72 browsable.

In this embodiment, in Step 26, if browsing control unit 31 makes first message 72 browsable, browsing of the first message is not limited in the subsequent period.

Subsequently, main control unit 21 notifies mobile terminal 3 of the next grave-visitation period, that is, the third grave-visitation period (Step 27). Main control unit 21 reads third grave-visitation period information 89 from period information storage unit 14, outputs the third grave-visitation period on mobile terminal 3, and displays it on the display screen of display unit 42.

Moreover, if main control unit 21 determines that first message 72 has not been distributed in Step 25, it proceeds to Step 27 without processing Step 26.

If Step 26 has not been executed during the second grave-visitation period, browsing control unit 31 does not release the browsing limitation of first message 72. In this case, first message 72 controlled so as to be unbrowsable in the first non-display period remains unbrowsable in the period after the first non-display period has elapsed as well.

Next, a description will be provided returning to Step 21. In Step 21, if period determination unit 26 determines that the communication unit reception time is not within the second grave-visitation period, period determination unit 26 reads second browsable period information 87 from period information storage unit 14, and determines whether the communication unit reception time is within the second browsable period shown by second browsable period information 87 (Step 30).

In Step 30, if period determination unit 26 determines that the communication unit reception time is within the second browsable period, main control unit 21 reads second message output information 103 from message output information storage unit 17 and determines whether second message 74 has been distributed to mobile terminal 3 (Step 31, FIG. 7).

If the date and time showing the time point at which second message 74 was first output on mobile terminal 3 is stored as second message output information 103, main control unit 21 determines that second message 74 has been distributed. In contrast, if the date and time showing the time point at which second message 74 was first output on mobile terminal 3 is not stored as second message output information 103, main control unit 21 determines that second message 74 has not been distributed.

In Step 31, if main control unit 21 determines that second message 74 has been distributed, browsing control unit 31 displays second message 74 on mobile terminal 3 (Step 33). That is, if mobile terminal 3 of the user receives second message 74 during the second grave-visitation period, the user can browse second message 74 in the second browsable period.

Subsequently, main control unit 21 notifies mobile terminal 3 of the next grave-visitation period, that is, the third grave-visitation period (Step 34). Main control unit 21 reads third grave-visitation period information 89 from period information storage unit 14, outputs the third grave-visitation period on mobile terminal 3, and displays it on the display screen of display unit 42.

Moreover, if main control unit 21 determines that second message 74 has not been distributed in Step 31, it proceeds to Step 34 without processing Step 33. That is, if mobile terminal 3 of the user does not receive second message 74 during the second grave-visitation period, the user cannot browse second message 74 after the second grave-visitation period has elapsed.

Next, a description will be provided returning to Step 30 (FIG. 6).

In Step 30, if period determination unit 26 determines that the communication unit reception time is not within the second browsable period shown by second browsable period information 87, period determination unit 26 reads second non-display period information 88 from period information storage unit 14 and determines whether the communication unit reception time is within the second non-display period shown by second non-display period information 88 (Step 36).

In Step 36, if period determination unit 26 determines that the communication unit reception time is within the second non-display period, main control unit 21 notifies mobile terminal 3 of the next grave-visitation period, that is, the third grave-visitation period (Step 34). If period determination unit 26 determines that the communication unit reception time is within the second non-display period, browsing control unit 31 controls second message 74 so as to be unbrowsable. In the second non-display period, first message 72 is not displayed on mobile terminal 3.

In Step 36, if period determination unit 26 determines that the communication unit reception time is not within the second non-display period, period determination unit 26 reads third grave-visitation period information 89 from period information storage unit 14 and determines whether the communication unit reception time is within the third grave-visitation period shown by third grave-visitation period information 89 (Step 37).

In Step 37, if period determination unit 26 determines that the communication unit reception time is within the third grave-visitation period, third message output unit 33 outputs and displays third message 77 on mobile terminal 3 (Step 39). Here, third message output unit 33 reads third message 77 from message storage unit 12, outputs read third message 77 on mobile terminal 3 via communication unit 7 and displays it on the display screen of display unit 42.

Moreover, third message output unit 33 also outputs first message ID 76 for identifying third message 77 on mobile terminal 3. Terminal control unit 46 stores third message ID 76 in terminal storage unit 49.

In Step 39, if third message output unit 33 outputs third message 77, main control unit 21 reads second message output information 103 from message output information storage unit 17 and determines whether second message 74 has been distributed to mobile terminal 3 (Step 40).

Main control unit 21 executes the same process as in Step 31.

In Step 40, if main control unit 21 determines that second message 74 has been distributed, browsing control unit 31 controls second message 74 so as to be browsable (Step 41). As mentioned above, in the second non-display period, browsing control unit 31 controls second message 74 so as to be unbrowsable. However, in Step 41, browsing control unit 31 releases the browsing limitation so as to make second message 74 browsable.

In this embodiment, in Step 41, if browsing control unit 31 makes second message 74 browsable, browsing of the second message is not limited in the subsequent period.

Moreover, if main control unit 21 determines that second message 74 has not been distributed in Step 40, Step 41 is not executed.

If Step 41 has not been executed during the third grave-visitation period, browsing control unit 31 does not release the browsing limitation of second message 74. In this case, second message 74 controlled so as to be unbrowsable in the second non-display period remains unbrowsable in the period after the second non-display period has elapsed as well.

Next, a description will be provided returning to Step 37.

In Step 37, if period determination unit 26 determines that the communication unit reception time is not within the third grave-visitation period, message output unit 34 for unspecified persons reads message 79 for unspecified persons from message storage unit 12, outputs read message 79 for unspecified persons on mobile terminal 3, and displays it on the display screen of display unit 42 (Step 43).

<Ordinary Process>

Figure 8:
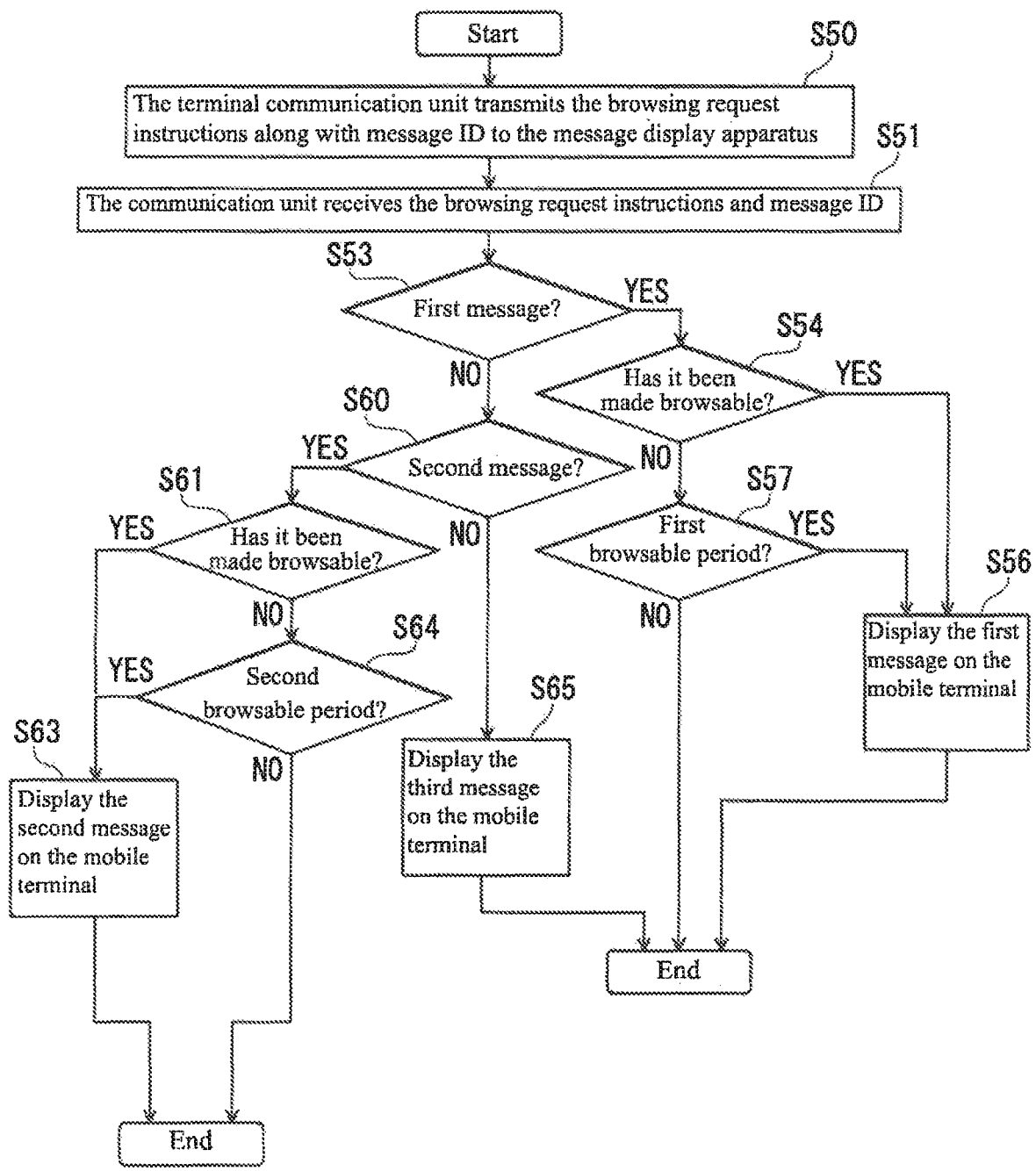
FIG. 8 is a flowchart illustrating the operation of the message display apparatus according to Embodiment 1.

Next, the process after mobile terminal 3 of the user receives at least one message of first message 72, second message 74, or third message 77 will be described with reference to FIG. 8. Note that the process illustrated in FIG. 8 is a process feasible outside of grave visitations and also a process in the event the user wishes to once again browse messages which mobile terminal 3 of the user received during grave visitations.

First, among the messages received by mobile terminal 3 during a grave visitation, terminal communication unit 47 transmits, to message display apparatus 1, the message ID of the message which the user desires to browse along with browsing request instructions for requesting browsing of the message (Step 50). In accordance with the operation of the user via operation unit 45, terminal control unit 46 reads the message ID of the message designated by the user from terminal storage unit 49, while terminal communication unit 47 transmits, to message display apparatus 1, message IDs read by terminal control unit 46 along with the browsing request instructions.

Note that at this time, main control unit 21 may display, on display unit 42 of mobile terminal 3, an input screen for selecting the desire to browse a message along with which message to browse, and terminal control unit 46 may read, from terminal storage unit 49, the message ID of the message which the user requests to browse, based on the input on the abovementioned input screen by the operation of the user via operation unit 45.

Moreover, terminal control unit 46 reads an input screen which is pre-stored in terminal storage unit 49 for selecting the desire to browse a message along with which message to browse from terminal storage unit 49, displays it on display unit 42 of mobile terminal 3, and terminal control unit 46 may read, from terminal storage unit 49, the message ID of the message that the user requests to browse, based on the input on the abovementioned input screen by the operation of the user via operation unit 45.

Subsequently, communication unit 7 receives the browsing request instructions and message ID which were transmitted in Step 50.

If communication unit 7 receives the browsing request instructions, main control unit 21 determines whether the message which the user desires to browse is first message 72 (Step 53). Main control unit 21 reads first message ID71 stored in message storage unit 12, determines whether first message ID71 corresponds with the message ID received by communication unit 7, and thereby determines whether the message which the user desires to browse is the first message.

In Step 53, if main control unit 21 determines that the message which the user desires to browse is first message 72, it determines whether the process of the abovementioned Step 26 has been executed. That is, main control unit 21 determines whether the process has already been executed in which browsing control unit 31 releases the browsing limitation of first message 72 within the first non-display period and makes first message 72 browsable (Step 54).

In Step 54, if main control unit 21 determines that the process for making first message 72 browsable has already been executed, browsing control unit 31 outputs first message 72 on mobile terminal 3 and displays it on the display screen of display unit 42 (Step 56).

If main control unit 21 determines that the process of making first message 72 browsable has not been executed in Step 54, period determination unit 26 determines whether the reception time in which communication unit 7 received the browsing request instructions along with the message ID in Step 51 is within the first browsable period based on first browsable period information 84 (Step 57).

In Step 57, if period determination unit 26 determines that the abovementioned reception time is within the first browsable period, browsing control unit 31 outputs first message 72 on mobile terminal 3 and displays it on the display screen of display unit 42 (Step 56).

In Step 57, if period determination unit 26 determines that the abovementioned reception time is not within the first browsable period, first message 72 is not displayed on mobile terminal 3.

Next, a description will be provided returning to Step 53.

In Step 53, if main control unit 21 determines that the message which the user desires to browse is not first message 72, main control unit 21 reads second message ID73 stored in message storage unit 12, determines whether the message ID received by communication unit 7 corresponds with second message ID73, and thereby determines whether the message which the user desires to browse is second message 74 (Step 60).

In Step 60, if main control unit 21 determines that the message which the user desires to browse is second message 74, it determines whether the process of the abovementioned Step 41 has been executed. That is, main control unit 21 determines whether the process has already been executed in which browsing control unit 31 releases the browsing limitation of second message 74 within the second non-display period and makes second message 74 browsable (Step 61).

In Step 61, if main control unit 21 determines that the process for making second message 74 browsable has already been executed, browsing control unit 31 outputs second message 74 on mobile terminal 3 and displays it on the display screen of display unit 42 (Step 63).

If main control unit 21 determines that the process of making first message 72 browsable has not been executed in Step 61, period determination unit 26 determines whether the reception time in which communication unit 7 received the browsing request instructions along with the message ID in Step 51 is within the second browsable period based on second browsable period information 87 (Step 64).

In Step 64, if period determination unit 26 determines that the abovementioned reception time is within the second browsable period, browsing control unit 31 outputs second message 74 to mobile terminal 3 and displays it on the display screen of display unit 42 (Step 63).

In Step 64, if period determination unit 26 determines that the abovementioned reception time is not within the second browsable period, second message 74 is not displayed on mobile terminal 3.

Next, a description will be provided returning to Step 60.

In Step 60, if main control unit 21 determines that the message which the user desires to browse is not the second message, third message output unit 33 outputs third message 77 to mobile terminal 3 and displays it on the display screen of display unit 42 (Step 65).

Note that if the process after the abovementioned Step 3 is executed, main control unit 21 stores, in storage unit 5, information showing that each process has been executed. Accordingly, for example, information showing that browsing control unit 31 has made the first message browsable (Step 26), as well as information showing that browsing control unit 31 has made the second message browsable (Step 41), can be stored in storage unit 5 and read by main control unit 21.

As described above, in message display apparatus 1 according to Embodiment 1, browsing control unit 31 controls first message 72 so as to be unbrowsable after the first browsable period has elapsed. Here, as mentioned above, browsing control unit 31 controls first message 72 so as to be unbrowsable during the first non-display period. Moreover, as mentioned above, if communication unit 7 receives image information (photographic image 62) of gravestone 60 along with the position information of mobile terminal 3 during the second grave-visitation period, which is the period after the first non-display period has elapsed, browsing control unit 31 controls first message 72 so as to be browsable.

That is, message display apparatus 1 includes control browsing control unit 31, which controls first message 72 so as to be unbrowsable in mobile terminal 3 for the predetermined period after the browsable period of period first message 72 has elapsed, and controls first message 72 so as to be browsable if communication unit 7 receives image information (photographic image 62) of gravestone 60 along with the position information of mobile terminal 3 after the abovementioned predetermined period has elapsed.

Consequently, in accordance with message display apparatus 1, first message 72 which the user received during a grave visitation is unbrowsable after the predetermined period has elapsed; however, if the user visits the grave again after that, the browsing limitation of the first message can be released so as to make first message 72 browsable again. Consequently, the user will be encouraged to visit the grave.

Moreover, in message display apparatus 1, in Step 23 as mentioned above, if communication unit 7 receives image information (photographic image 62) of gravestone 60 along with the position information of mobile terminal 3 during the second grave-visitation period, which is the period after the first non-display period has elapsed, second message output unit 32 outputs and displays second message 74 on mobile terminal 3.

That is, message display apparatus 1 includes second message output unit 32 for outputting and displaying, on mobile terminal 3, pre-stored second message 74 associated with the deceased person's ID (deceased person's identification information) 51 specified by deceased person specification unit 23 if communication unit 7 receives image information (photographic image 62) of gravestone 60 along with the position information of mobile terminal 3 after the abovementioned predetermined period has elapsed.

Consequently, in accordance with message display apparatus 1, one must visit the grave again after the period (first non-display period) of unbrowsable first message 72 has elapsed, in order to receive second message 74. Therefore, the user will be further encouraged to visit the grave.

Moreover, because various data, messages, etc. are transmitted and received via mobile terminal 3 of the user in message display apparatus 1, an apparatus need not be separately attached or juxtaposed onto the grave.

Therefore, message display apparatus 1 according to Embodiment 1 can deliver a message to a grave visitor without attaching or juxtaposing a display apparatus onto the grave, thereby encouraging persons to whom a message has been left to visit the grave.

Moreover, as mentioned above in Steps 21 to 26, in message display apparatus 1, outputting the second message using second message output unit 32 (Step 23), in addition to making the first message browsable using browsing control unit 31 (Step 26), is executed during the second grave-visitation period.

That is, if period determination unit 26 determines that the abovementioned communication unit reception time is within the second grave-visitation period (second distribution period), second message output unit 32 outputs and displays second message 74 on mobile terminal 3. Moreover, if period determination unit 26 determines that the abovementioned communication unit reception time is within the second grave-visitation period (second distribution period), browsing control unit 31 controls first message 72 so as to be browsable in mobile terminal 3.

Consequently, in accordance with message display apparatus 1, if the grave is visited during the second grave-visitation period (second distribution period) in which second message 74 can be received, second message 74 can be received and the browsing limitation of first message 72 will be released. Therefore, because the desire of the user to visit the grave will be further enhanced, the user can be further encouraged to visit the grave.

Moreover, in message display apparatus 1, if period determination unit 26 determines that the abovementioned communication unit reception time is not within the first grave-visitation period (first distribution period), first message output unit 29 does not output first message 72 to mobile terminal 3. Moreover, if period determination unit 26 determines that the abovementioned communication unit reception time is not within the second grave-visitation period (second distribution period), second message output unit 32 does not output second message 74 to mobile terminal 3.

Consequently, it is required to visit the grave during the limited period of the first grave-visitation period (first distribution period) in order to receive first message 72, while it is required to visit the grave during the limited period of the second grave-visitation period (second distribution period) in order to receive second message 74. Therefore, the user can be further encouraged to visit the grave. Moreover, because the deceased can preset the period to deliver a message, a message in accordance with the period can be left.

Note that in the abovementioned message display apparatus 1, the embodiment is described in which third message 77 is displayed in addition to first message 72 and second message 74. Browsing control of second message 74 using browsing control unit 31, outputting third message 77 using third message output unit 33, etc. also can exert the effect of encouraging the user to visit the grave as in the abovementioned effect.

Moreover, as mentioned above in Step 11, if user ID (user identification information) received by communication unit 7 does not correspond with pre-stored destination identification information 111 showing the destination person of first message 72, message output unit 34 for unspecified persons outputs and displays message 79 for unspecified persons on mobile terminal 3 of the user.

Accordingly, even if there is no first message 72 for the user, grave visitations enable the user to receive a message (message 79 for unspecified persons) of deceased person 67. Therefore, the user can be further encouraged to visit the grave.

Note that in this embodiment, because the destination person of first message 72, second message 74, and third message 77 is the same person, even if there is no second message or third message 77 for the user, the user can receive a message (message 79 for unspecified persons) of deceased person 67, regarding second message 74 and third message 77 as well, by visiting the grave.

Moreover, as mentioned above in Steps 1 to 5, using the image information (photographic image 62) of gravestone 60 transmitted from mobile terminal 3 of the user along with the position information of mobile terminal 3, deceased person specification unit 23 specifies deceased ID (deceased person's identification information) 51. Consequently, deceased person 67 associated with gravestone 60 can be specified with high precision.

Embodiment 2

Figure 9:
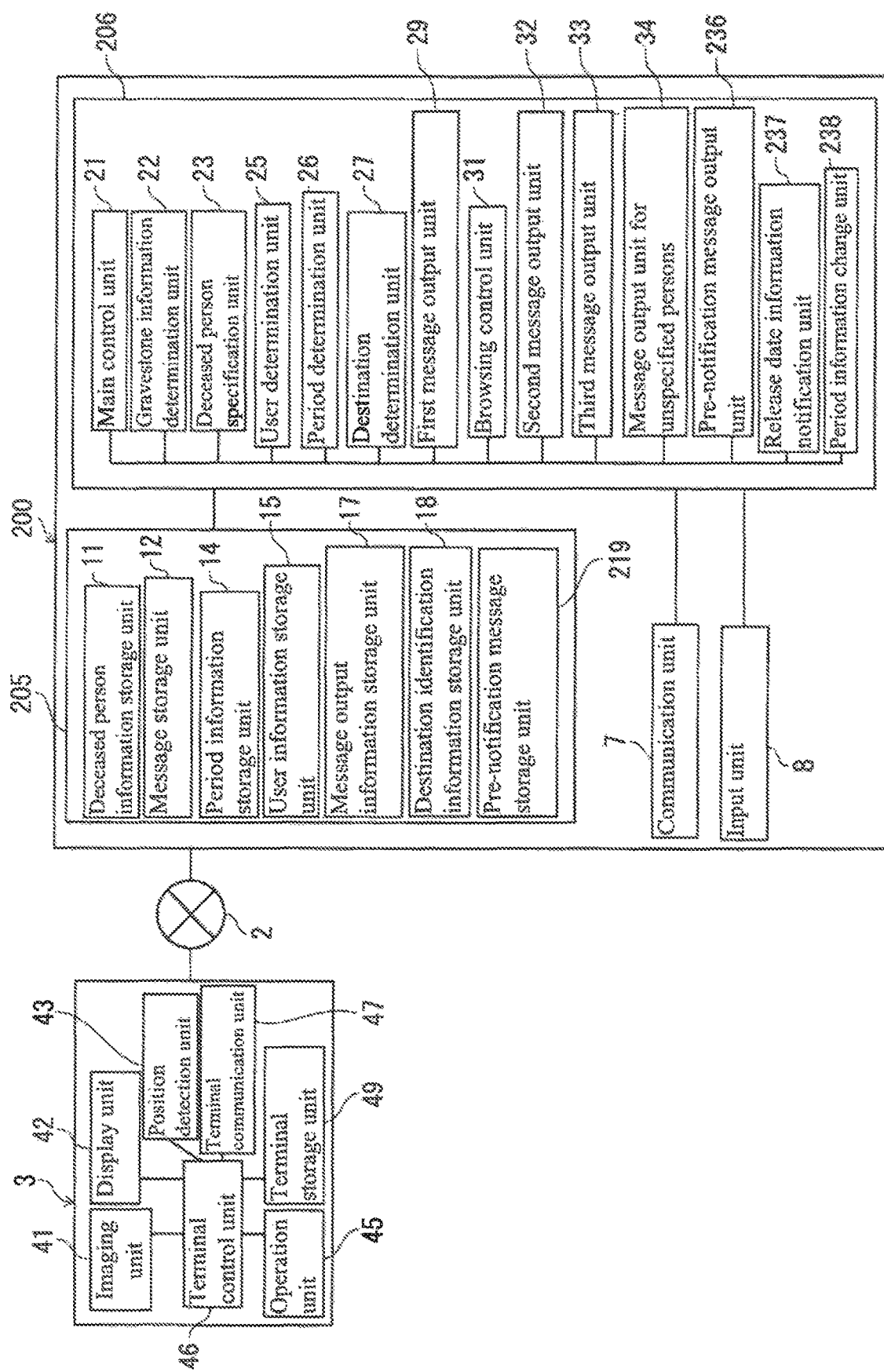
FIG. 9 is a functional block diagram of a message display apparatus according to Embodiment 2.

FIG. 9 illustrates a functional block diagram of message display apparatus 200 according to Embodiment 2. Some of each configuration unit of message display apparatus 200 is the same as message display apparatus 1 according to Embodiment 1. Here, the points differing from the abovementioned Embodiment 1 will be mainly described. In FIG. 9, identical components are labelled with identical labels as in Embodiment 1.

Message display apparatus 200 has the function of the abovementioned message display apparatus 1 and includes each component of message display apparatus 1 illustrated in FIG. 1. Different from message display apparatus 1 of Embodiment 1, message display apparatus 200 includes pre-notification message storage unit 219, pre-notification message output unit 236, release date information notification unit 237, and period information change unit 238. In message display apparatus 200, storage unit 205 includes pre-notification message storage unit 219, in addition to each configuration unit possessed by storage unit 5 of the abovementioned message display apparatus 1. Moreover, control unit 206 of message display apparatus 200 includes pre-notification message output unit 236, release date information notification unit 237, and period information change unit 238, in addition to each configuration unit possessed by control unit 6 of the abovementioned message display apparatus 1.

Pre-notification message storage unit 219 stores a pronotification message regarding the messages left by the deceased. As illustrated in FIG. 10, in this embodiment, pre-notification message storage unit 219 stores the prenotification message of second message 74 as second prenotification message 243 and stores the pre-notification message of third message 77 as third pre-notification message 246. Second pre-notification message 243 is a moving image for encouraging browsing of second message 74, as well as the preview of second message 74. Similarly, third pre-notification message 246 is a moving image for encouraging browsing of third message 77, as well as the preview of third message 77. Second pre-notification message 243, for example, may be a moving image for publishing only a portion of second message 74 or may be a moving image having a message for encouraging browsing of second message 74. The same applies to third pre-notification message 246.

Moreover, each pre-notification message ID for identifying each pre-notification message is stored as pre-notification message identification information. In this embodiment, pre-notification message storage unit 219 stores second pro-notification message ID242 which is associated with second pre-notification message 243 and identifies second pro-notification message 243, as well as third pre-notification message ID245 which is associated with third pre-notification message 246 and identifies third pre-notification message 246. Each pre-notification message and pre-notification message ID stored in pre-notification message storage unit 219 is associated with deceased ID 51 in order to identify which deceased person 67 the pre-notification message is from.

Pre-notification message output unit 236 outputs and displays second pre-notification message 243 on mobile terminal 3 of the user in the first non-display period. Moreover, pre-notification message output unit 236 outputs and displays third pre-notification message 246 on mobile terminal 3 of the user in the second non-display period.

Release date information notification unit 237 notifies mobile terminal 3 of the user, of the release date information showing the number of days until the second grave-visitation period (second distribution period) based on second grave-visitation period information (second distribution period information) 86. Moreover, release date information notification unit 237 notifies mobile terminal 3 of the user, of the release date information showing the number of days until the third grave-visitation period (third distribution period) based on third grave-visitation period (third distribution period information) 89.

Period information change unit 238 changes second grave-visitation period information 86 based on the changing instructions of second grave-visitation period information 86. Moreover, period information change unit 238 changes third grave-visitation period information 89 based on the changing instructions of third grave-visitation period information 89.

Next, the operation of message display apparatus 200 will be described.

Message display apparatus 200 executes the abovementioned process as in the abovementioned message display apparatus 1 with reference to the flowcharts of FIGS. 6 to 8. Here, processes different from message display apparatus 1 of Embodiment 1 will be described.

Figure 11:
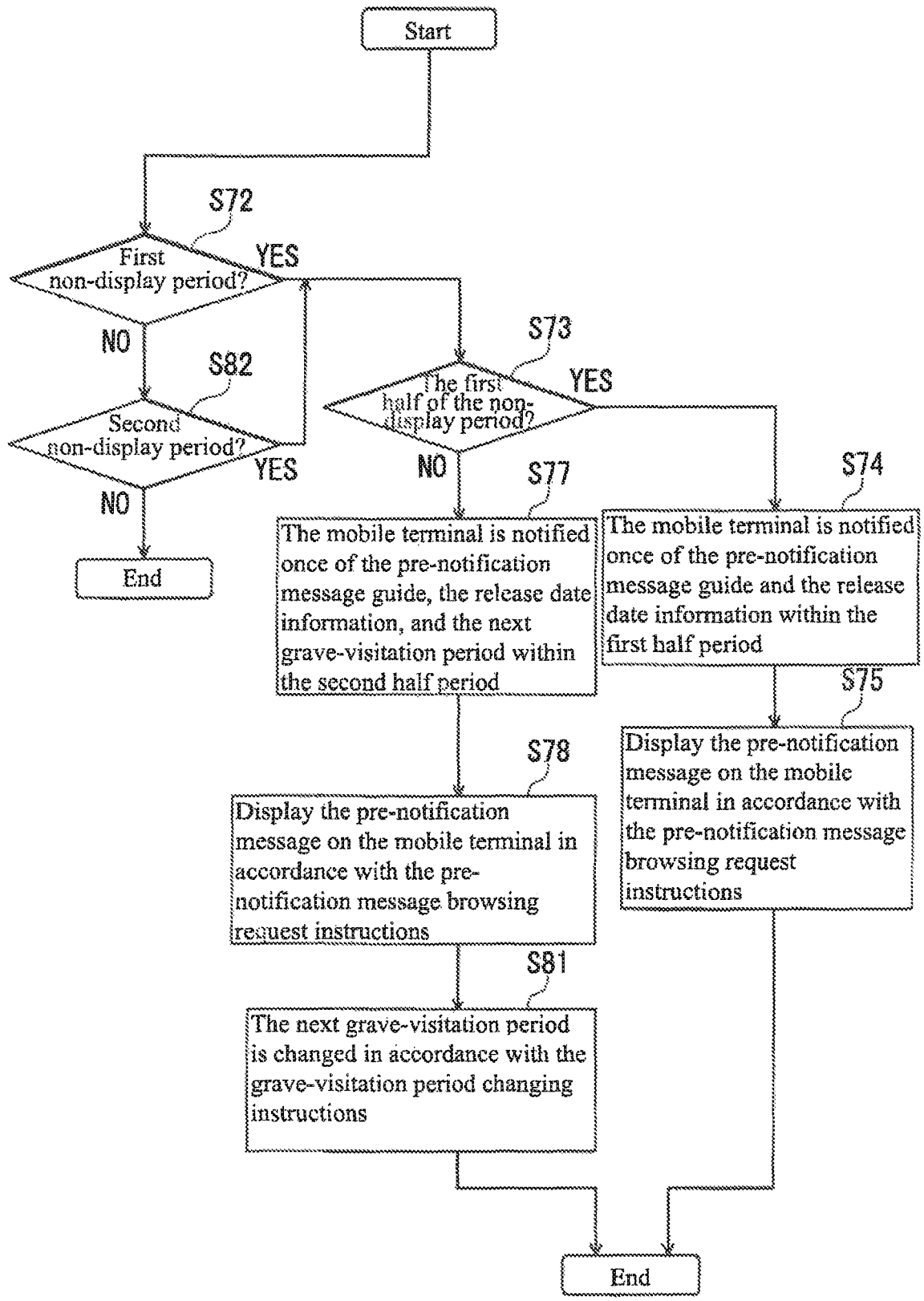
FIG. 11 is a flowchart illustrating the operation of the message display apparatus according to Embodiment 2.

The process illustrated in FIG. 11 is a process for distributing, to mobile terminal 3, the pre-notification message of the message which can be received next. Moreover, the process illustrated in FIG. 11 is executed if the current time is within the first non-display period or the second non-display period. Period determination unit 26 determines whether the current time is within the first non-display period or the second non-display period, based on first non-display period information 85 and second non-display period information 88.

First, period determination unit 26 reads first non-display period information 85 from period information storage unit 14 and determines whether the current time is within the first non-display period (Step 72).

In Step 72, if period determination unit 26 determines that the current time is within the first non-display period, period determination unit 26 determines whether the current time is the first half of the first non-display period based on first non-display period information 85 (Step 73). Note that here, the first non-display period is halved and set to a first half and a second half.

In Step 73, if period determination unit 26 determines that the current time is within the first half of the first non-display period, mobile terminal 3 is notified once of the pre-notification message guide and release date information within the first half period of the first non-display period (Step 74). In Step 74, main control unit 21 outputs and displays the pre-notification message guide on mobile terminal 3. The pre-notification message guide notifies that the pre-notification message is browsable. Moreover, release date information notification unit 237 reads second grave-visitation period information 86 from period information storage unit 14, calculates the number of days from the current time until the second grave-visitation period, and outputs and displays, on mobile terminal 3, the number of days until the second grave-visitation period as the release date information.

For example, the pre-notification message guide and release date information are notified to mobile terminal 3 by a push notification.

Main control unit 21, together with the pre-notification message guide, displays, on the display screen of display unit 42 of mobile terminal 3, an input screen for making the user select the desire to browse the pre-notification message.

If the pre-notification message browsing request instructions for requesting browsing of the pre-notification message are transmitted from mobile terminal 3 based on the input on the abovementioned input screen by the operation of the user via operation unit 45, communication unit 7 receives the instructions. In accordance with the pre-notification message browsing request instructions received by communication unit 7, pre-notification message output unit 236 outputs second pre-notification message 243 on mobile terminal 3 and displays it on the display screen of display unit 42 (Step 75).

Next, a description will be provided returning to Step 73.

In Step 73, if period determination unit 26 determines that the current time is not the first half of the first non-display period, mobile terminal 3 is notified once of the pre-notification message guide, release date information, and next grave-visitation period (here, the second grave-visitation period) within the second half period of the first non-display period (Step 77). As in the abovementioned Step 74, main control unit 21 outputs the pre-notification message guide, while release date information notification unit 237 outputs the release date information. Moreover, in Step 77, release date information notification unit 237 reads second grave-visitation period information 86 from period information storage unit 14 and displays and outputs the second grave-visitation period on mobile terminal 3.

In addition, main control unit 21, together with the pre-notification message guide, displays, on the display screen of display unit 42 of mobile terminal 3, an input screen for making the user select the desire to browse the pre-notification message. Moreover, release date information notification unit 237, together with the second grave-visitation period, outputs and displays, on mobile terminal 3, a change period input screen for making the user select the desire to change the second grave-visitation period and accepting the input of the second grave-visitation period after the change which the user desires.

If the pre-notification message browsing request instructions for requesting browsing of the pre-notification message are transmitted from mobile terminal 3 based on the input on the abovementioned input screen by the operation of the user via operation unit 45, communication unit 7 receives the instructions. As in the abovementioned Step 75, in accordance with the pre-notification message browsing request instructions received by communication unit 7, pre-notification message output unit 236 outputs second pre-notification message 243 on mobile terminal 3 and displays it on the display screen of display unit 42 (Step 78).

Subsequently, if the grave-visitation period changing instructions indicating a desire to change the second grave-visitation period (second distribution period), as well as information on changing to the desired period showing the second grave-visitation period after the change, is transmitted based on the input on the abovementioned change period input screen by the operation of the user via operation unit 45, communication unit 7 receives them.

Period information change unit 238 changes second grave-visitation period information 86, based on the grave-visitation period changing instructions and the information on changing to the desired period, such that the second grave-visitation period serves as the second grave-visitation period after the change shown in the information on changing to the desired period (Step 81). Period information change unit 238 stores changed second grave-visitation period information 86 in period information storage unit 14.

Next, a description will be provided returning to Step 72.

In Step 72, if period determination unit 26 determines that the current time is not within the first non-display period, period determination unit 26 reads second non-display period information 88 from period information storage unit 14 and determines whether the current time is within the second non-display period (Step 82).

In Step 82, if period determination unit 26 determines that the current time is within the second non-display period, the same process as in the processes of the abovementioned Steps 73 to 81 is executed regarding third pre-notification message 246 and the third grave-visitation period. That is, in the second non-display period, pre-notification message output unit 236 outputs and displays third pre-notification message 246 on mobile terminal 3 (Step 75, Step 78). Moreover, in Steps 74 and 77, release date information notification unit 237 reads third grave-visitation period information 89 from period information storage unit 14, calculates the number of days from the current time until the third grave-visitation period and outputs and displays, on mobile terminal 3, the number of days until the third grave-visitation period as the release date information. In Step 77, release date information notification unit 237 reads third grave-visitation period information 89 from period information storage unit 14 and displays and outputs the third grave-visitation period on mobile terminal 3.

In Step 81, period information change unit 238 changes third grave-visitation period information (third distribution period information) 89, based on the grave-visitation period changing instructions regarding the third grave-visitation period along with the information on changing to the desired period, such that the third grave-visitation period serves as the third grave-visitation period (third distribution period) after the change shown in the information on changing to the desired period. Moreover, period information change unit 238 stores changed third grave-visitation period information 89 in period information storage unit 14.

Moreover, as mentioned above, the process illustrated in FIG. 11 is executed if the current time is within the first non-display period or the second non-display period. Accordingly, in Step 82, if period determination unit 26 determines that the current time is not within the second non-display period, the abovementioned processes of Steps 73 to 81 are not executed.

Note that in this embodiment, the pre-notification message is not controlled for browsing by browsing control unit 31, such that the once distributed pre-notification message is browsable even after that.

As described above, message display apparatus 200 according to Embodiment 2 includes pre-notification message output unit 236 for outputting and displaying, on mobile terminal 3 of the user, the pre-notification message (second pre-notification message 243) for pre-notifying second message 74 after the first browsable period has elapsed (in the abovementioned example, the first non-display period).

Accordingly, the browsing desire of the user to read second message 74 can be enhanced. Moreover, because second message 74 is output on mobile terminal 3 during grave visitations, the desire of the user to visit the grave will be further enhanced. Accordingly, the user can be further encouraged to visit the grave.

Note that in Embodiment 2, as mentioned above, in the second non-display period, regarding third message 77, pre-notification message output unit 236 outputs and displays third pre-notification message 246 on mobile terminal 3. Accordingly, the browsing desire of the user regarding third message 77 as well will be enhanced, such that the user can be further encouraged to visit the grave.

Moreover, message display apparatus includes release date information notification unit 237 for notifying mobile terminal 3 of the user, of the release date information showing the number of days until the second grave-visitation period (second distribution period) based on second grave-visitation period information (second distribution period information) 86 after the first browsable period has elapsed (in the abovementioned example, the first non-display period).

Accordingly, a sense of expectancy of the user to wait for the arrival of the second grave-visitation period will be enhanced. Moreover, in order not to forget the second grave-visitation period, a reminder will be issued to the user. Accordingly, the user can be further encouraged to visit the grave. Note that the same applies to the third grave-visitation period.

Moreover, in Embodiment 2, period information change unit 238 changes second grave-visitation period information (second distribution period information) 86 based on the grave-visitation period changing instructions (the changing instructions of the second distribution period) and information on changing to the desired period, such that the second grave-visitation period (second distribution period) serves as the second grave-visitation period (second distribution period) after the change shown in the information on changing to the desired period.

Accordingly, even if a situation of being unable to visit the grave occurs within the scheduled second grave-visitation period, the second message can be received within the second grave-visitation period after the change by changing the second grave-visitation period. Note that the same applies to the third grave-visitation period.

Embodiment 3

Figure 12:
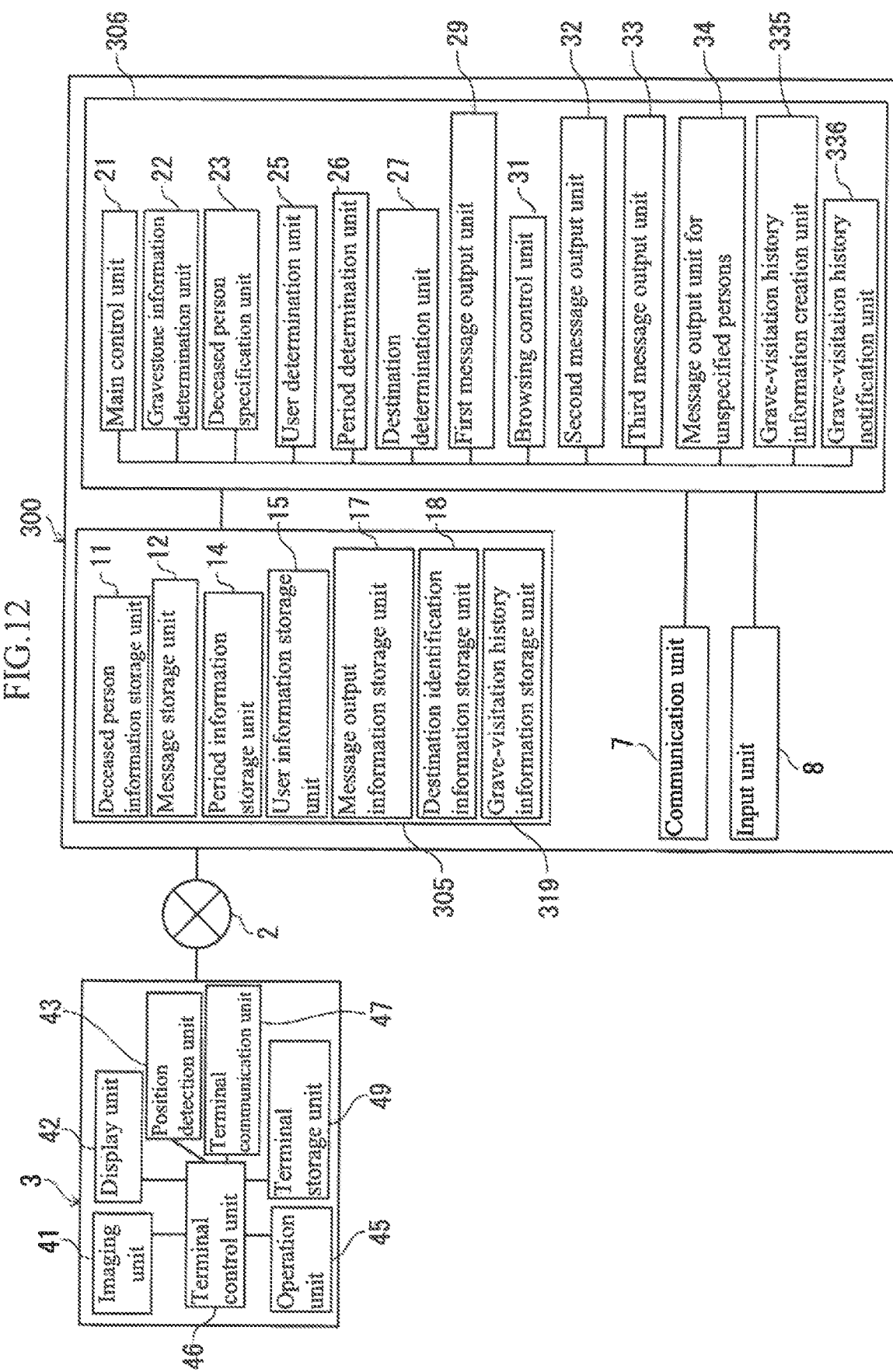
FIG. 12 is a functional block diagram of a message display apparatus according to Embodiment 3.

FIG. 12 illustrates a functional block diagram of message display apparatus 300 according to Embodiment 3. Some of each configuration unit of message display apparatus 300 is the same as message display apparatus 1 according to Embodiment 1. Here, the points differing from the abovementioned Embodiment 1 will be mainly described. In FIG. 12, identical components are labelled with identical labels as in Embodiment 1.

Message display apparatus 300 has the function of the abovementioned message display apparatus 1 and includes each component of message display apparatus 1 illustrated in FIG. 1. Different from message display apparatus 1 of Embodiment 1, message display apparatus 300 includes grave-visitation history information storage unit 319, grave-visitation history information creation unit 335, and grave-visitation history notification unit 336. In message display apparatus 300, storage unit 305 includes grave-visitation history information storage unit 319, in addition to each configuration unit possessed by storage unit 5 of the abovementioned message display apparatus 1. Moreover, control unit 306 of message display apparatus 300 includes grave-visitation history notification unit 336 and grave-visitation history information creation unit 335, in addition to each configuration unit possessed by control unit 6 of the abovementioned message display apparatus 1.

As illustrated in FIG. 13, grave-visitation history information storage unit 319 stores grave-visitation history information 341 showing that the user visited the grave of deceased person 67. In this embodiment, the date and time showing the time point of a reception time (communication unit reception time) in which communication unit 7 received image information (photographic image 62) of gravestone 60, the position information of mobile terminal 3, and user ID 91 is stored as grave-visitation history information 341.

Grave-visitation history information 341 is associated with user ID 91 of the abovementioned the user along with deceased ID 51 of the abovementioned deceased person 67.

If user determination unit 25 determines that there exists user ID 91 which corresponds with user ID 91 received by communication unit 7, grave-visitation history information creation unit 335 creates grave-visitation history information 341 associated with corresponded user ID 91.

If grave-visitation history information creation unit 335 creates grave-visitation history information 341, grave-visitation history notification unit 336 notifies mobile terminal 3 of other users specified by other user IDs 91 associated with deceased ID 51 that the user visited the grave of deceased person 67.

Next, the operation of message display apparatus 300 will be described.

Message display apparatus 300 executes the abovementioned process as in the abovementioned message display apparatus 1 with reference to the flowcharts of FIGS. 6 to 8. Here, the process differing from message display apparatus 1 of Embodiment 1 will be described.

Figure 14:
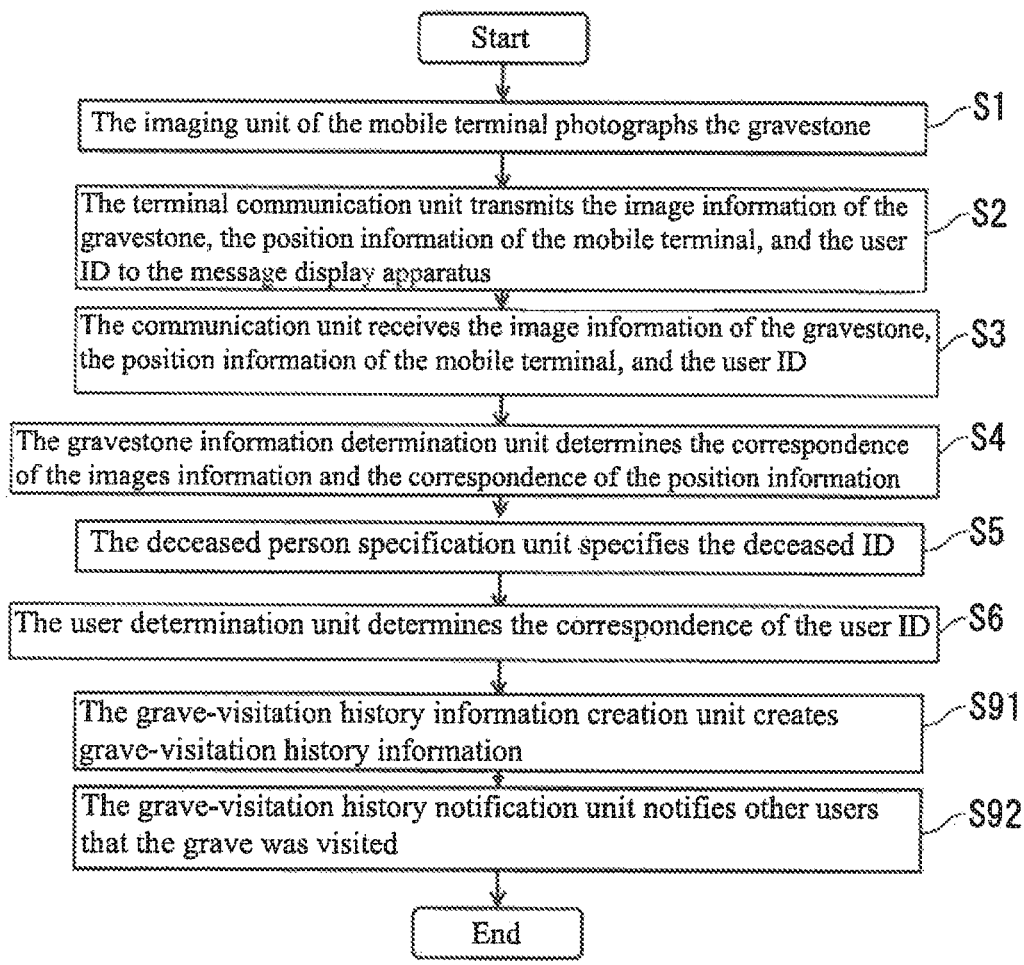
FIG. 14 is a flowchart illustrating the operation of the message display apparatus according to Embodiment 3.

The process illustrated in FIG. 14 is executed during grave visitations as in the abovementioned process with reference to the flowcharts of FIGS. 6 and 7, in addition to being executed at the same time as the processes of FIGS. 6 and 7.

In the flowchart of FIG. 14, because the processes of Steps 1 to 6 are the same as those of the abovementioned Steps 1 to 6 illustrated in FIG. 6, a description thereof is omitted.

If user determination unit 25 determines that user ID 91 associated with deceased ID 51 specified by deceased person specification unit 23 corresponds with user ID 91 received by communication unit 7, grave-visitation history information creation unit 335 creates grave-visitation history information 341 (Step 91). Grave-visitation history information creation unit 335 obtains the date and time showing the time point of the abovementioned communication unit reception time, creates grave-visitation history information 341, and stores created grave-visitation history information 341 in grave-visitation history information storage unit 319.

In Step 91, if grave-visitation history information creation unit 335 creates grave-visitation history information 341, grave-visitation history notification unit 336 notifies mobile terminal 3 of other users specified by other user IDs 91 associated with deceased ID 51 that the user identified by user ID 91 associated with grave-visitation history information 341 visited the grave of deceased person 67 (Step 92). Here, it is assumed that there are multiple user IDs 91 associated with a single deceased ID 51. If grave-visitation history notification unit 336 notifies that the user visited the grave of deceased person 67, it may notify the abovementioned other users of user name 93 of the user who visited the grave, and may notify the abovementioned other users of the date and time showing the time point of the abovementioned communication unit reception time based on grave-visitation history information 341.

Note that at the time point when grave-visitation history information 341 is created, grave-visitation history notification unit 336 may notify other users of it; alternatively, at the time point when other users desire, or during a preset predetermined period, grave-visitation history notification unit 336 may notify other users thereof.

As described above, in message display apparatus 300 according to Embodiment 3, if grave-visitation history information creation unit 335 creates grave-visitation history information 341, grave-visitation history notification unit 336 notifies mobile terminal 3 of other users identified by other pre-stored user IDs 91 (other user identification information) associated with deceased ID (deceased person's identification information) 51 that the user identified by user ID 91 associated with grave-visitation history information 341 visited the grave of deceased person 67.

Accordingly, the abovementioned other users may know whether persons other than themselves have visited the grave of deceased person 67. The users identified by user IDs 91 associated with deceased IDs 51 are probably the family, relatives, or concerned unities of deceased person 67. Via notification that the family, relatives, or concerned unities of deceased person 67 other than themselves visited the grave, awareness of the notified users will be enhanced to visit the grave. Accordingly, the user can be further encouraged to visit the grave.

Embodiment 4

Figure 15:
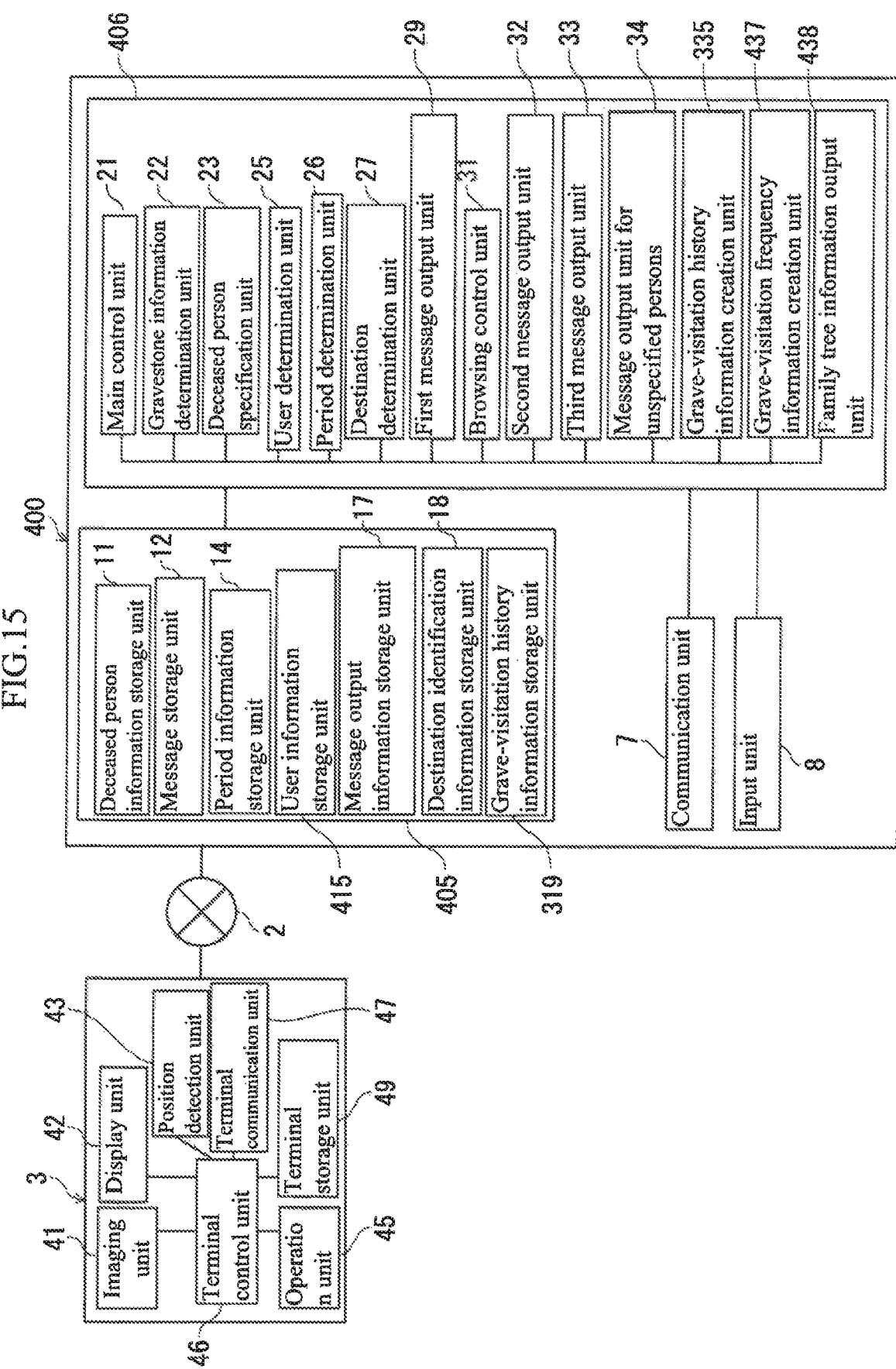
FIG. 15 is a functional block diagram of a message display apparatus according to Embodiment 4.

FIG. 15 illustrates a functional block diagram of message display apparatus 400 according to Embodiment 4. Some of each configuration unit of message display apparatus 400 is the same as a portion of message display apparatus 1 according to Embodiment 1 or message display apparatus 300 according to Embodiment 3. Here, the points differing from the abovementioned Embodiment 1 or 3 will be mainly described. In FIG. 15, identical components are labelled with identical labels as in Embodiment 1 or 3.

Message display apparatus 400 has the function of the abovementioned message display apparatus 1 and includes each component of message display apparatus 1 illustrated in FIG. 1. Different from message display apparatus 1 of Embodiment 1, message display apparatus 400 includes grave-visitation history information storage unit 319, grave-visitation history information creation unit 335, grave-visitation frequency information creation unit 437, and family tree information output unit 438. Moreover, user information storage unit 415 stores family relationship information 441 showing the family relationship with deceased person 67, in addition to data stored in user information storage unit 15 according to Embodiment 1.

In message display apparatus 400, storage unit 405 includes grave-visitation history information storage unit 319, in addition to each configuration unit possessed by storage unit 5 of the abovementioned message display apparatus 1. Moreover, control unit 406 of message display apparatus 400 includes grave-visitation history information creation unit 335, grave-visitation frequency information creation unit 437, and family tree information output unit 438, in addition to each configuration unit possessed by control unit 6 of the abovementioned message display apparatus 1.

The configuration of grave-visitation history information storage unit 319 and grave-visitation history information creation unit 335 is the same as the abovementioned configuration in Embodiment 3.

As illustrated in FIG. 16, user information storage unit 415 includes family relationship information 441. User information storage unit 415 stores the family relationship (for example, "grandchild") of the user to deceased person 67 as family relationship information 441. Family relationship information 441 is associated with user ID 91 and deceased ID 51. Family relationship information 441, together with information such as user name 93, is pre-stored in user information storage unit 415 in the process of the abovementioned pre-registration. Note that upon storing family relationship information 441, communication unit 7 or input unit 8 inputs family relationship information 441 in the message display apparatus, main control unit 21 stores input family relationship information 441 in user information storage unit 415.

Grave-visitation frequency information creation unit 437 creates grave-visitation frequency information showing the grave-visitation frequency of the user, based on created grave-visitation history information 341 created by grave-visitation history information creation unit 335.

Family tree information output unit 438 displays a family tree including deceased person 67 and the user on mobile terminal 3 of the user based on the abovementioned family relationship information 441.

Next, the operation of message display apparatus 400 will be described.

Message display apparatus 400 executes the abovementioned process as in the abovementioned message display apparatus 1 with reference to the flowcharts of FIGS. 6 to 8. Here, the processes differing from message display apparatus 1 of Embodiment 1 will be described.

Figure 17:
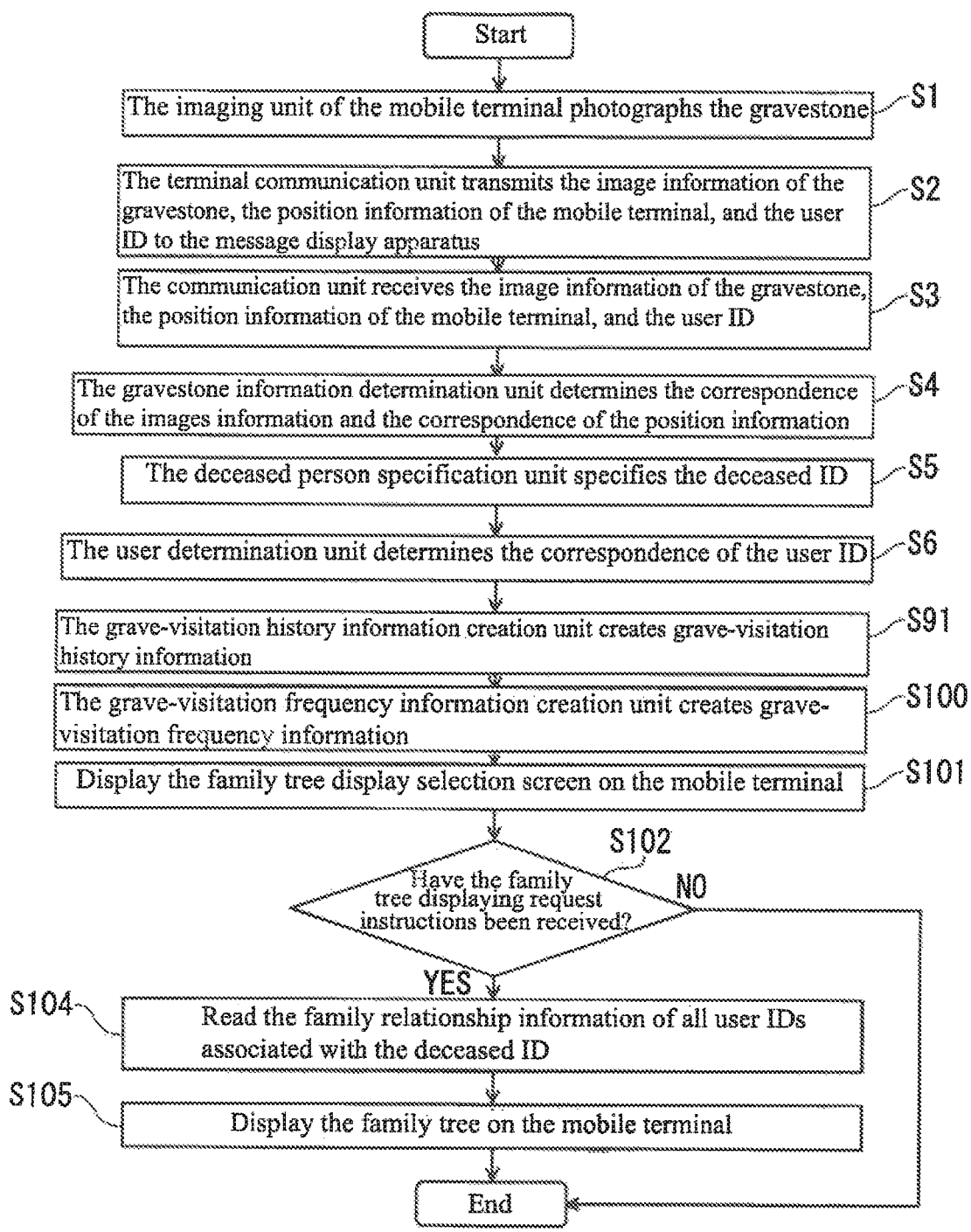
FIG. 17 is a flowchart illustrating the operation of the message display apparatus according to Embodiment 4.

The process illustrated in FIG. 17 is executed during grave visitation as in the abovementioned process with reference to the flowcharts of FIGS. 6 and 7, in addition to being executed at the same time as the processes of FIGS. 6 and 7.

In the flowchart of FIG. 17, because the processes of Steps 1 to 6 are the same as those of the abovementioned Steps 1 to 6 illustrated in FIG. 6, a description thereof is omitted. Moreover, because the process of Step 91 is the same as the process of the abovementioned Step 91 illustrated in FIG. 14, a description thereof is omitted.

In Step 91, if grave-visitation history information creation unit 335 creates grave-visitation history information 341, grave-visitation frequency information creation unit 437 creates the abovementioned grave-visitation frequency information (Step 100). Grave-visitation frequency information creation unit 437 reads grave-visitation history information 341 stored in grave-visitation history information storage unit 319 in Step 91 from grave-visitation history information storage unit 319, calculates the grave-visitation frequency in accordance with the number of grave-visitation history information 341, and creates grave-visitation frequency information showing the calculated grave-visitation frequency. In this embodiment, the amount of grave-visitation history information 341 with different dates is regarded as the grave-visitation frequency. If there is multiple grave-visitation history information 341 for the same date, it is regarded as a one-time grave visitation.

Subsequently, main control unit 21 displays the family tree display selection screen for making the user select the desire to display the family tree, on the display screen of display unit 42 of mobile terminal 3 (Step 101). The user can input, on mobile terminal 3, family tree displaying request instructions for requesting that the family tree be displayed, via the family tree display selection screen. If the family tree displaying request instructions are input on mobile terminal 3, terminal communication unit 47 transmits the abovementioned family tree displaying request instructions to message display apparatus 400. Communication unit 7 receives the family tree displaying request instructions transmitted from mobile terminal 3.

Subsequently, main control unit 21 determines whether communication unit 7 has received the family tree displaying request instructions (Step 102).

In Step 102, if main control unit 21 determines that communication unit 7 has received the family tree displaying request instructions, family tree information output unit 438 reads, from user information storage unit 415, all user IDs 91 associated with deceased ID 51 specified in Step 5, as well as family relationship information 441 associated with this user ID 91 (Step 104). Here, it is assumed that there are multiple user IDs 91 associated with a single deceased ID 51. Multiple users identified by read multiple user IDs 91 include the user who has transmitted the family tree displaying request instructions, as well as other users.

Based on user ID 91 and family relationship information 441 read in Step 104, family tree information output unit 438 outputs, on mobile terminal 3, family tree information for displaying the family tree and displays the family tree on mobile terminal 3 display (Step 105). The family tree information is information for displaying the family tree on mobile terminal 3. For example, family tree information output unit 438 may create image data of the family tree based on user ID 91 and family relationship information 441 read in Step 104, and output, on mobile terminal 3, created image data as family tree information. Moreover, for example, family tree information output unit 438 may output, on mobile terminal 3, user name 93 of the user identified by user ID 91 read in Step 104, family relationship information 441, and deceased name 52 identified by deceased ID 51 as the family tree information, and terminal control unit 46 may display the family tree of a predetermined design on the display screen of display unit 42 using display output user name 93, family relationship information 441, and deceased name 52.

Moreover, in this embodiment, family tree information output unit 438 changes the display showing each user displayed on the family tree, in accordance with the grave-visitation frequency created in Step 100. For example, in the family tree displayed on mobile terminal 3, family tree information output unit 438 may largely display or highlight user names 93 of users with high grave-visitation frequency. Moreover, family tree information output unit 438 may display the grave-visitation frequency of the user, together with user name 93, in the family tree displayed on mobile terminal 3.

Note that in this embodiment, if a family relationship (for example, "friend", etc.) unrelated to the family of deceased person 67 and the user is stored as family relationship information 441, family tree information output unit 438 excludes users associated with family relationship information 441 and displays the family tree. Moreover, if the family tree displaying request instructions have been transmitted from mobile terminal 3 of the user having a family relationship unrelated to the family of deceased person 67 and the user, family tree information output unit 438 does not display the family tree on mobile terminal 3.

As described above, message display apparatus 400 according to Embodiment 4 includes family tree information output unit 438 for displaying the family tree on mobile terminal 3. Accordingly, the user can view the family tree regarding deceased person 67 and the user and confirm the existence of new relatives not grasped, as well as estranged relatives, for example. Moreover, because the user can grasp relatives to which user IDs 91 have been distributed, for example, the abovementioned family tree can be utilized for selecting guests, etc. for events such as a memorial service for deceased person 67.

Moreover, as illustrated in Steps 1 and 2 of FIG. 17, the process illustrated in FIG. 17 is executed during grave visitations. Accordingly, one must visit the grave in order to view the family tree. Therefore, the desire for the user to visit the grave can be further enhanced.

Moreover, in the abovementioned message display apparatus 400, family tree information output unit 438 changes the display showing each user in the family tree (user and other users identified by user ID 91 received by communication unit 7), in accordance with the grave-visitation frequency shown by grave-visitation frequency information created by grave-visitation frequency information creation unit 437.

Accordingly, the grave-visitation frequency of the user can be more intuitively grasped. Moreover, by knowing the grave-visitation condition of other users, awareness of grave visitations will be enhanced. Accordingly, the user can be further encouraged to visit the grave.

Other Embodiments

While embodiments of the present invention have been mentioned above, the present invention is not limited to the previously described embodiments, with various variations and changes possible.

In the described embodiments, various messages such as first message 72 and second message 74 may be output on mobile terminal 3 by any method. For example, as mentioned above, download distribution may be used in which various messages output on mobile terminal 3 are saved on mobile terminal 3. If first message 72 is downloaded and distributed in the first grave-visitation period, terminal control unit 46 stores, in terminal storage unit 49, first message 72 received via terminal communication unit 47. Moreover, browsing control unit 31 controls downloaded first message 72 so as to be unbrowsable after the first browsable period has elapsed. That is, first message 72, which is downloaded in mobile terminal 3 in the first grave-visitation period and stored in terminal storage unit 49, is a browsable message for a limited period.

Moreover, if browsing control unit 31 controls first message 72 so as to be browsable in the second grave-visitation period, the browsing limitation of first message 72 downloaded in the first grave-visitation period can be released so as to make first message 72 browsable again. Note that if downloaded first message 72 is displayed on mobile terminal 3 within the first browsable period, terminal control unit 46 may read first message 72 from terminal storage unit 49, and display it on the display screen of display unit 42. The same applies to second message 74.

While the destination person of first message 72, second message 74, and third message 77 is set to the same person in Embodiment 1, the destination person of each message may be set to a different person. In this case, destination identification information storage unit 18 stores user ID 91 of each user, who is the destination person of each message. Moreover, it may be configured such that each message may be output on mobile terminal 3 only if destination determination unit 27 executes the same destination person determination process as in the process of the previously described Step 7 (FIG. 6) prior to outputting each message on mobile terminal 3 and destination person information of each message corresponds with user ID 91 received by communication unit 7.

For example, it may be configured such that destination identification information storage unit 18 or destination determination unit 27 may not be provided or various messages such as first message 72 may be output on mobile terminal 3 without using destination identification information 111, etc.

Moreover, it may be configured such that user information storage unit 15 and user determination unit 25 may not be provided or various messages such as first message 72 may be output on mobile terminal 3 without using user ID 91.

In the abovementioned Step 6, for example, it may be configured such that if user determination unit 25 determines that user ID 91 received by communication unit 7 does not correspond with user ID 91 associated with deceased ID 51, message output unit 34 for unspecified persons displays message 79 for unspecified persons on mobile terminal 3 of the user. Moreover, it may be configured such that if destination determination unit 27 determines that user ID 91 received by communication unit 7 does not correspond with destination identification information 111, etc. in Step 7 without processing Step 6, message output unit 34 for unspecified persons displays message 79 for unspecified persons on mobile terminal 3 of the user. Note that the case in which it does not correspond with user ID 91 received by communication unit 7 includes the case in which communication unit 7 has not received user ID 91 and there is no user ID 91, which is a comparison object.

In Embodiment 1, outputting second message 74 using second message output unit 32 (Step 23) and making first message 72 browsable using browsing control unit 31 (Step 26) are simultaneously executed during the second grave-visitation period; however, these processes may not be executed during the same period or at the same time. For example, making first message 72 browsable using browsing control unit 31 (Step 26) may be executed during the second grave-visitation period, while outputting second message 74 using second message output unit 32 (Step 23) may be executed during the third grave-visitation period.

In the correspondence determination process of image information (photographic image 62) of gravestone 60 received by communication unit 7 and pre-stored image information 54 of gravestone 60 in Step 4 of FIG. 6, any image matching determination process may be executed. For example, by utilizing an existing image process library such as OpenCV, a determination may be made regarding whether image information (photographic image 62) of gravestone 60 received by communication unit 7 corresponds with pre-stored image information 54 of gravestone 60.

In the previously described embodiments, upon executing the process of notifying mobile terminal 3 of the user of the next grave-visitation period (Step 19, etc.), main control unit 21 may be configured to notify mobile terminal 3 of the user that there are messages which the user can receive during the next grave-visitation period.

It may be configured such that prior to displaying various messages such as first message 72, main control unit 21 displays, on mobile terminal 3, an input screen for making the user select the desire to browse messages; wherein, if the browsing request instructions for requesting the browsing of messages are transmitted from mobile terminal 3 by the operation of the user via operation unit 45, the messages are displayed on mobile terminal 3.

Moreover, it may be configured such that if various message output units, such as first message output unit 29, output and display various messages such as first message 72 on mobile terminal 3, and after a predetermined period has elapsed (for example, after coming home from grave visitation) after various messages are output on mobile terminal 3, in accordance with the selection of the user, various messages are displayed on mobile terminal 3.

Mobile terminal 3 may transmit and receive various data with message display apparatuses 1, 200, 300, 400 via dedicated application software (for example, applications of smartphones) installed in terminal storage unit 49.

In the previously described embodiments, various messages such as first message 72 are moving images and may be messages of any form. For example, they may be static images or messages of audio or characters.

While the case of outputting first message 72, second message 74, and third message 77 on mobile terminal 3 is described in the abovementioned embodiments, further messages may be output or only first message 72 and second message 74 may be output. Moreover, in accordance with the number of messages, more grave-visitation periods (message distribution periods) may be set.

In the previously described embodiments, various periods such as grave-visitation periods may be set in any manner. For example, various periods such as grave-visitation periods may be set without using the date of death information of the deceased. Moreover, the abovementioned various periods may be set based on specific dates which occur in each year such as the birthday and wedding anniversary of the destination person of messages or the deceased, or based on dates of specific events such as the coming-of-age ceremony of the destination person of the messages, or at predetermined intervals desired by the deceased.

For example, main control unit 21 may be configured so as to notify mobile terminal 3 of history information of messages which have not been output on mobile terminal 3 during a predetermined grave-visitation period (distribution period).

Moreover, if communication unit 7 has not received the image information of gravestone 60, the position information of mobile terminal 3, and user ID 91 within the predetermined grave-visitation period (distribution period), or messages which were scheduled to be distributed have not been output within the predetermined grave-visitation period, main control unit 21 may display a notification encouraging grave visitation on mobile terminal 3 of the user identified by the abovementioned user ID 91. Moreover, if the remaining days in the predetermined grave-visitation period (distribution period) are the predetermined days or less, and communication unit 7 has not received the image information of gravestone 60, the position information of mobile terminal 3, and user ID 91, or messages which were scheduled to be distributed have not been output within the predetermined grave-visitation period, main control unit 21 may display a notification encouraging grave visitation on mobile terminal 3.

Moreover, for example, even if message ID 71, etc. of various messages such as first message 72 do not have be stored in terminal storage unit 49, the process illustrated in FIG. 8 may be executed without transmitting message ID from mobile terminal 3 to message display apparatus 1. For example, if main control unit 21 can display, on display unit 42 of mobile terminal 3, an input screen for selecting the desire to browse a message along with which message to browse among messages which have been distributed to mobile terminal 3, terminal communication unit 47 may transmit, to message display apparatus 1, identification information for identifying messages for which the user requests browsing along with the browsing request instructions of the messages, based on the input on the abovementioned input screen by the operation of the user via operation unit 45, and in message display apparatus 1, messages for which the user requests browsing may be identified using the abovementioned transmitted identification information.

In Embodiment 2, the abovementioned process with reference to FIG. 11 may be executed for first message 72. For example, pre-notification message output unit 236 may be configured to output the pre-notification message of first message 72 on mobile terminal 3 prior to the first grave-visitation period, or release date information notification unit 237 may be configured to display the release date information and first grave-visitation period on mobile terminal 3 so as to change the first grave-visitation period.

In Embodiment 2, while the first and the second non-display periods are divided into a first half and the second half, with the pre-notification messages distributed once in each, the pre-notification message may be distributed at any timing or any number of times. Moreover, distribution of the pre-notification message may be executed at a random timing.

Moreover, in Embodiment 2, without providing pre-notification message storage unit 219, pre-notification message output unit 236 may be configured to read various messages such as first message 72 from message storage unit 12, and output only a portion of read messages (for example, opening messages for several seconds) as the pre-notification message on mobile terminal 3.

In Embodiment 2, for example, the frequency at which the specific grave-visitation period can be changed may be limited within a predetermined frequency (for example, up to three times). Moreover, if the remaining days of the grave-visitation period is a predetermined days or less, main control unit 21 or release date information notification unit 237 may be configured to output and display, on mobile terminal 3, an input screen for making the user select the desire to change the grave-visitation period and accepting the input of the grave-visitation period after the change desired by the user, and period information change unit 238 may be configured to change grave-visitation period information 83, 86, 89 in accordance with the input of the user.

While the date and time showing the time point of the abovementioned communication unit reception time is stored as grave-visitation history information 341 in Embodiments 3 and 4, data of other forms may be stored as grave-visitation history information 341. For example, it may be configured such that if communication unit 7 receives image information (photographic image 62) of gravestone 60 along with the position information of mobile terminal 3, grave-visitation history information creation unit 335 creates grave-visitation history information 341 showing only that there was a reception without obtaining information on the date and time, and created grave-visitation history information 341 is stored in grave-visitation history information storage unit 319.

Moreover, in Embodiment 4, main control unit 21 may be configured to display, on mobile terminal 3, the user names and grave-visitation history frequencies of all users associated with deceased ID 51, including users with stored relationships unrelated to the family of deceased person 67 and the user.

For example, in the previously described embodiments, deceased ID 51 may have multiple associations with one user ID 91. In this case, upon displaying the family tree on mobile terminal 3 of a user in Embodiment 4, family tree information output unit 438 may be configured to display, on the family tree, deceased names 52 of multiple deceased persons 67 identified by multiple deceased IDs 51 associated with user ID 91 of the user, along with user names 93 of other users identified by other user IDs 91 associated with each of the abovementioned multiple deceased IDs 51. Moreover, family tree information output unit 438 may be configured to display, on the family tree, the posthumous Buddhist name or Buddhist name of deceased person 67 pre-stored in deceased person information storage unit 11, or may be configured to display, on the family tree, other various information.

Moreover, in the previously described embodiments, deceased person information storage unit 11 may be configured so as to pre-store the image data of the memorial tablet of the deceased. In this case, it may be configured such that if image data of the memorial tablet transmitted by mobile terminal 3 or other computers and received by communication unit 7 corresponds with image data of the memorial tablet pre-stored in deceased person information storage unit 11, pre-stored various data (for example, image information 54 and position information 55 of gravestone 60) may change. As a result, if stored various data changes, users can change data and users other than the owner or manager of the memorial tablet can be prevented from rewriting data without permission.

Moreover, another example may be configured such that various data in which only users identified by pre-designated user ID 91 are stored can be changed.

Various messages such as first message 72 may be displayed on mobile terminal 3 as moving images using augmented reality (AR). For example, holding mobile terminal 3 over gravestone 60, a video in which the deceased recites a message may be overlapped and displayed in front of gravestone 60. In this case, various messages such as first message 72 may be subjected to the background transmission process utilizing a chroma key in advance. For example, when the deceased registers a message during his/her lifetime in message display apparatus 1, etc. via dedicated application software installed on mobile terminal 3, main control unit 21 executes the background transmission process for AR (augmented reality) on the message received via communication unit 7, allowing the message subjected to the background transmission process to be configured so as to be stored in message storage unit 12.

Moreover, main control unit 21 may be configured to store, in message output information storage unit 17, the output information of all messages distributed and set during each grave-visitation period, while a special message, which can be received only if all the messages are output on mobile terminal 3 of a user, may be pre-stored in message storage unit 12. In this case, control unit 6 includes a special message output unit for outputting the special message, and the special message output unit reads the output information of all messages from message output information storage unit 17; wherein, if all messages have been output, the special message output unit may read the special message from message storage unit 12 and output and display the read special message on the abovementioned mobile terminal 3.

Each of the abovementioned function units configuring message display apparatuses 1, 200, 300, 400 may be provided in a simplex computer, or may be dispersed and provided in multiple computers communicatable via communication network 2.

Moreover, various processes described in the abovementioned embodiments may be executed on the side of message display apparatuses 1, 200, 300, 400, or may be executed on the mobile terminal 3 side.

Moreover, in the previously described embodiments, "associated" includes the case in which each data is directly or indirectly related or linked.

For example, various processes may be executed by recording a program for achieving the function of message display apparatuses 1, 200, 300, 400 in a computer readable recording medium, and reading and executing the program recorded in this recording medium in a computer system. Note that the "computer system" used herein include hardware such as OS and peripheral equipment.

Moreover, the "computer system" includes a homepage providing environment (or display environment) if it utilizes a WWW system.

Moreover, the "computer readable recording medium" is a portable medium such as a flexible disk, a magneto-optical disk, ROM, CD-ROM, or DVD, as well as a storage apparatus such as a hard disk integrated in the computer system. The "computer readable recording medium" further includes: a medium for dynamically holding the program for a short period of time, such as a communication line in the case of transmitting the program via a network such as the Internet along with a communication circuit such as a telephone circuit; and a medium for holding the program for a certain period of time, such as a volatile memory inside the computer system serving as a server and client. Moreover, the program may be provided to achieve a portion of the function, or further the function may be achieved in combination with a program already recorded in the computer system.

Regarding the previously described embodiments, the following appendices are further disclosed.

(Appendix 1)

A message display apparatus for displaying messages of a deceased person on a mobile terminal of a user, comprising:

a communication unit for receiving image information of a gravestone transmitted from the mobile terminal along with position information of the mobile terminal;

a deceased person specification unit for specifying a deceased person's identification information if the image information of the gravestone received by the communication unit corresponds with the pre-stored image information of the gravestone, and the position information of the mobile terminal received by the communication unit corresponds with the pre-stored position information of the gravestone, wherein the deceased person's identification information identifys the deceased and is associated with the pre-stored image information of the gravestone along with the pre-stored position information of the gravestone;

a first message output unit for outputting and displaying a first message on the mobile terminal, wherein the first message is associated with the deceased person's identification information specified by the deceased person specification unit, and pre-stored;

a browsing control unit for controlling the first message so as to be unbrowsable in the mobile terminal for a predetermined period after a browsable period has elapsed, based on pre-stored browsable period information showing the browsable period of the first message, and controlling the first message so as to be browsable if the communication unit receives the image information of the gravestone along with the position information of the mobile terminal after the predetermined period has elapsed; and a second message output unit for outputting and displaying a second message on the mobile terminal, wherein the second message is associated with the deceased person's identification information specified by the deceased person specification unit, and pre-stored, if the communication unit receives the image information of the gravestone along with the position information of the mobile terminal after the predetermined period has elapsed.

(Appendix 2)

The message display apparatus according to Appendix 1, further comprising: a period determination unit for determining that a reception time at which the communication unit received the image information of the gravestone along with the position information of the mobile terminal is within the first distribution period based on pre-stored first distribution period information showing a first distribution period in which the first message can be output on the mobile terminal, and determining that the reception time is within the second distribution period based on pre-stored second distribution period information showing a second distribution period in which the second message can be output on the mobile terminal, wherein, if the period determination unit determines that the reception time is within the first distribution period, the first message output unit outputs and displays the first message on the mobile terminal, if the period determination unit determines that the reception time is within the second distribution period, the second message output unit outputs and displays the second message on the mobile terminal, and if the period determination unit determines that the reception time is within the second distribution period, the browsing control unit controls the first message so as to be browsable in the mobile terminal.

(Appendix 3)

The message display apparatus according to Appendix 2, wherein, if the period determination unit determines that the reception time is not within the first distribution period, the first message output unit does not output the first message to the mobile terminal, and if the period determination unit determines that the reception time is not within the second distribution period, the second message output unit does not output the second message to the mobile terminal.

(Appendix 4)

The message display apparatus according to any one of Appendices 1 to 3, further including: a message output unit for unspecified persons for outputting a message for unspecified persons, which is a pre-stored message for unspecified persons, wherein the communication unit receives user identification information for identifying the user, with the user identification information transmitted from the mobile terminal, and the message output unit for unspecified persons outputs and displays the message for unspecified persons on the mobile terminal of the user if the user identification information received by the communication unit does not correspond with destination identification information showing the destination person of the first message.

(Appendix 5)

The message display apparatus according to any one of Appendices 1 to 4, further including: a pre-notification message output unit for outputting and displaying a pre-notification message for pre-notifying the second message on the mobile terminal after the browsable period has elapsed.

(Appendix 6)

The message display apparatus according to Appendix 2, or any one of Appendices 3 to 5 dependent from Appendix 2, further including: a release date information notification unit for notifying the mobile terminal of release date information showing the number of days until the second distribution period, based on the second distribution period information after the browsable period has elapsed.

(Appendix 7)

The message display apparatus according to Appendix 2, or any one of Appendices 3 to 6 dependent from Appendix 2, further including: a period information change unit for changing the second distribution period information, wherein the communication unit receives, from the mobile terminal, changing instructions of the second distribution period along with information on changing to a desired period showing the second distribution period after the change, and the period information change unit changes the second distribution period information, such that the second distribution period serves as the second distribution period after the change shown in the information on changing to the desired period, based on the changing instructions and the information on changing to the desired period.

(Appendix 8)

The message display apparatus according to any one of Appendices 1 to 7, further comprising: a grave-visitation history information creation unit for creating grave-visitation history information showing that the user visited a grave of the deceased; and a grave-visitation history notification unit for notifying that the user visited the grave of the deceased, wherein the communication unit receives user identification information for identifying the user, with the user identification information transmitted from the mobile terminal, the grave-visitation history information creation unit creates grave-visitation history information, which is associated with the deceased person's identification information specified by the deceased person specification unit, and associated with the user identification information received by the communication unit, and the grave-visitation history notification unit notifies the mobile terminal of other users identified by the other pre-stored users' identification information associated with the deceased person's identification information specified by the deceased person specification unit that the user visited the grave of the deceased, if the grave-visitation history information creation unit creates the grave-visitation history information, wherein the user is identified by the user identification information which is associated with the grave-visitation history information.

(Appendix 9)

The message display apparatus according to any one of Appendices 1 to 8, further comprising: a family tree information output unit for displaying a family tree including the deceased and the user on the mobile terminal of the user based on pre-stored family relationship information showing the family relationship with the deceased, wherein the communication unit receives user identification information for identifying the user, with the user identification information transmitted from the mobile terminal, and based on the family relationship information of the user identified by the user identification information which is associated with the deceased person's identification information specified by the deceased person specification unit and received by the communication unit, along with the family relationship information of other users identified by the other pre-stored users' identification information which is associated with the deceased person's identification information specified by the deceased person specification unit, the family tree information output unit creates family tree information for displaying the family tree, outputs the mobile terminal of the user, and displays the family tree on the mobile terminal of the user.

(Appendix 10)

The message display apparatus according to Appendix 9, further comprising: a grave-visitation frequency information creation unit for creating grave-visitation frequency information showing the grave-visitation frequency of the user, wherein the family tree information output unit changes a display showing the user and other users in the family tree in accordance with the grave-visitation frequency shown by the grave-visitation frequency information created by the grave-visitation frequency information creation unit.

(Appendix 11)

A message display method in a message display apparatus for displaying messages of a deceased person on a mobile terminal of a user, comprising:

a reception step in which a communication unit of the message display apparatus receives image information of a gravestone transmitted from the mobile terminal along with position information of the mobile terminal;

a deceased person specification step for specifying a deceased person's identification information if the image information of the gravestone received by the communication unit in the reception step corresponds with the pre-stored image information of the gravestone, and the position information of the mobile terminal received by the communication unit in the reception step corresponds with the pre-stored position information of the gravestone, wherein the deceased person's identification information identifies the deceased and is associated with the pre-stored image information of the gravestone along with the pre-stored position information of the gravestone;

a first message output step in which a first message output unit of the message display apparatus outputs and displays a first message on the mobile terminal, wherein the first message is associated with the deceased person's identification information specified by the deceased person specification unit in the deceased person specification step, and pre-stored;

a browsing control step in which a browsing control unit of the message display apparatus controls the first message so as to be unbrowsable in the mobile terminal for a predetermined period after a browsable period has elapsed, based on pre-stored browsable period information showing the browsable period of the first message, and controls the first message so as to be browsable if the communication unit receives the image information of the gravestone along with the position information of the mobile terminal in the reception step after the predetermined period has elapsed; and a second message output step in which, if the communication unit receives the image information of the gravestone along with the position information of the mobile terminal after the predetermined period has elapsed, a second message output unit of the message display apparatus outputs and displays a second message on the mobile terminal, wherein the second message is associated with the deceased person's identification information specified by the deceased person specification unit in the deceased person specification step, and pre-stored.

(Appendix 12)

A message display program in a message display apparatus for displaying messages of a deceased person on a mobile terminal of a user, wherein the following steps are executed in the message display apparatus:

a reception step in which a communication unit of the message display apparatus receives image information of a gravestone transmitted from the mobile terminal along with position information of the mobile terminal;

a deceased person specification step for specifying a deceased person's identification information if the image information of the gravestone received by the communication unit in the reception step corresponds with the pre-stored image information of the gravestone, and the position information of the mobile terminal received by the communication unit in the reception step corresponds with the pre-stored position information of the gravestone, wherein the deceased person's identification information identifies the deceased and is associated with the pre-stored image information of the gravestone along with the pre-stored position information of the gravestone;

a first message output step in which a first message output unit of the message display apparatus outputs and displays a first message on the mobile terminal, wherein the first message is associated with the deceased person's identification information specified by the deceased person specification unit in the deceased person specification step, and pre-stored;

a browsing control step in which a browsing control unit of the message display apparatus controls the first message so as to be unbrowsable in the mobile terminal for a predetermined period after a browsable period has elapsed, based on pre-stored browsable period information showing the browsable period of the first message, and controls the first message so as to be browsable if the communication unit receives the image information of the gravestone along with the position information of the mobile terminal in the reception step after the predetermined period has elapsed; and a second message output step in which, if the communication unit receives the image information of the gravestone along with the position information of the mobile terminal after the predetermined period has elapsed, a second message output unit of the message display apparatus outputs and displays a second message on the mobile terminal, wherein the second message is associated with the deceased person's identification information specified by the deceased person specification unit in the deceased person specification step, and pre-stored.

EXPLANATION OF THE SYMBOLS 1, 200, 300, 400 message display apparatuses
3 mobile terminal
7 communication unit
23 deceased person specification unit
26 period determination unit
29 first message output unit
31 browsing control unit
32 second message output unit
34 message output unit for unspecified persons
51 deceased ID (deceased person's identification information)
83 first grave-visitation period information (first distribution period information)
86 second grave-visitation period information (second distribution period information)
91 user ID (user identification information)
237 release date information notification unit
236 pre-notification message output unit
238 period information change unit
335 grave-visitation history information creation unit
336 grave-visitation history notification unit
438 family tree information output unit

The invention claimed is:

1. A message display apparatus for displaying messages of a deceased person on a mobile terminal of a user, comprising:

a communicator configured to receive image information of a gravestone transmitted from the mobile terminal along with position information of the mobile terminal;

a processor configured to:

specify a deceased person's identification information if the image information of the gravestone received by the communicator corresponds with pre-stored image information of the gravestone, and the position information of the mobile terminal received by the communicator corresponds with pre-stored position information of the gravestone, wherein the deceased person's identification information identifies the deceased and is associated with the pre-stored image information of the gravestone along with the pre-stored position information of the gravestone;

output and control a display to display a first message on the mobile terminal, wherein the first message is associated with the deceased person's identification information specified by the processor, and pre-stored;

control the first message so as to be unbrowsable in the mobile terminal for a predetermined period after a browsable period has elapsed, based on pre-stored browsable period information showing the browsable period of the first message, and control the first message so as to be browsable if the communicator receives the image information of the gravestone along with the position information of the mobile terminal after the predetermined period has elapsed;

output and control a display to display a second message on the mobile terminal, wherein the second message is associated with the deceased person's identification information specified by the processor, and pre-stored, if the communicator receives the image information of the gravestone along with the position information of the mobile terminal after the predetermined period has elapsed;

determine that a reception time at which the communicator received the image information of the gravestone along with the position information of the mobile terminal is within a first distribution period based on pre-stored first distribution period information showing the first distribution period in which the first message can be output on the mobile terminal, and determine that the reception time is within a second distribution period based on pre-stored second distribution period information showing the second distribution period in which the second message can be output on the mobile terminal; and if the processor determines that the reception time is within the first distribution period, the processor outputs and displays the first message on the mobile terminal, if the processor determines that the reception time is within the second distribution period, the processor outputs and displays the second message on the mobile terminal, and if the processor determines that the reception time is within the second distribution period, the processor controls the first message so as to be browsable in the mobile terminal.

2. The message display apparatus according to claim 1, wherein, if the processor determines that the reception time is not within the first distribution period, the processor does not output the first message to the mobile terminal, and
if the processor determines that the reception time is not within the second distribution period, the processor does not output the second message to the mobile terminal.

3. The message display apparatus according to claim 1, wherein the processor is further configured to output a pre-stored message for unspecified persons, and
the communicator is further configured to receive user identification information for identifying the user, with the user identification information transmitted from the mobile terminal, and
the processor is further configured to output and display the message for unspecified persons on the mobile terminal of the user if the user identification information received by the communicator does not correspond with destination identification information showing a destination person of the first message.

4. The message display apparatus according to claim 1, wherein the processor is further configured to output and display a pre-notification message for pre-notifying the second message, on the mobile terminal after the browsable period has elapsed.

5. The message display apparatus according to claim 1, wherein the processor is further configured to notify the mobile terminal of release date information showing a number of days until the second distribution period, based on the second distribution period information after the browsable period has elapsed.

6. The message display apparatus according to claim 1, wherein the processor is further configured to change the second distribution period information, and
the communicator is further configured to receive, from the mobile terminal, changing instructions of the second distribution period along with information on changing to a desired period showing the second distribution period after the change, and
the processor is further configured to change the second distribution period information, such that the second distribution period serves as the second distribution period after the change shown in the information on changing to the desired period, based on the changing instructions and the information on changing to the desired period.

7. The message display apparatus according to claim 1, wherein the processor is further configured to:
create grave-visitation history information showing that the user visited a grave of the deceased; and
notify that the user visited the grave of the deceased, and
the communicator is further configured to receive user identification information for identifying the user, with the user identification information transmitted from the mobile terminal,
the processor is further configured to create grave-visitation history information, which is associated with the deceased person's identification information specified by the processor, and associated with the user identification information received by the communicator, and
the processor is further configured to notify the mobile terminal of other users identified by the other pre-stored users' identification information associated with the deceased person's identification information specified by the processor that the user visited the grave of the deceased, if the processor creates the grave-visitation history information, wherein the user is identified by the user identification information which is associated with the grave-visitation history information.

8. The message display apparatus according to claim 1, wherein the processor is further configured to display a family tree including the deceased and the user on the mobile terminal of the user based on pre-stored family relationship information showing the family relationship with the deceased,
the communicator is further configured to receive user identification information for identifying the user, with the user identification information transmitted from the mobile terminal, and
based on the family relationship information of the user identified by the user identification information which is associated with the deceased person's identification information specified by the processor and received by the communicator, along with the family relationship information of other users identified by the other pre-stored users' identification information which is associated with the deceased person's identification information specified by the processor, the processor is further configured to create family tree information for displaying the family tree, output the mobile terminal of the user, and display the family tree on the mobile terminal of the user.

9. The message display apparatus according to claim 8, wherein the processor is further configured to:
create grave-visitation frequency information showing the grave-visitation frequency of the user, and
change a display showing the user and other users in the family tree in accordance with the grave-visitation frequency shown by the grave-visitation frequency information created by the processor.

10. A message display method in a message display apparatus for displaying messages of a deceased person on a mobile terminal of a user, comprising:
a reception step in which a communicator of the message display apparatus receives image information of a gravestone transmitted from the mobile terminal along with position information of the mobile terminal;
a deceased person specification step in which a processor of the message display apparatus specifies a deceased person's identification information in response to the image information of the gravestone being received by the communicator in the reception step corresponding with pre-stored image information of the gravestone, and the position information of the mobile terminal received by the communicator in the reception step corresponding with pre-stored position information of the gravestone, wherein the deceased person's identification information identifies the deceased and is associated with the pre-stored image information of the gravestone along with the pre-stored position information of the gravestone;
a first message output step in which the processor of the message display apparatus outputs and displays a first message on the mobile terminal, wherein the first message is associated with the deceased person's identification information specified by the processor in the deceased person specification step, and pre-stored;
a browsing control step in which the processor of the message display apparatus controls the first message so as to be unbrowsable in the mobile terminal for a predetermined period after a browsable period has elapsed, based on pre-stored browsable period information showing the browsable period of the first message, and controls the first message so as to be browsable in response to the communicator receiving the image information of the gravestone along with the position information of the mobile terminal in the reception step after the predetermined period has elapsed; and a second message output step in which, in response to the communicator receiving the image information of the gravestone along with the position information of the mobile terminal after the predetermined period has elapsed, the processor of the message display apparatus outputs and displays a second message on the mobile terminal, wherein the second message is associated with the deceased person's identification information specified by the processor in the deceased person specification step, and pre-stored;

determining that a reception time at which the reception step occurs is within a first distribution period based on pre-stored first distribution period information showing the first distribution period in which the first message can be output on the mobile terminal;

determining that the reception time is within a second distribution period based on pre-stored second distribution period information showing the second distribution period in which the second message can be output on the mobile terminal;

outputting and displaying the first message on the mobile terminal when the reception time is within the first distribution period;

outputting and displaying the second message on the mobile terminal when the reception time is within the second distribution period; and controlling the first message so as to be browsable in the mobile terminal when the reception time is within the second distribution period.

11. A non-transitory computer readable medium in a message display apparatus for displaying messages of a deceased person on a mobile terminal of a user, wherein the non-transitory computer readable medium includes instructions that cause the following steps to be executed in the message display apparatus:

a reception step in which a communicator of the message display apparatus receives image information of a gravestone transmitted from the mobile terminal along with position information of the mobile terminal;

a deceased person specification step in which a processor of the message display apparatus specifies a deceased person's identification information in response to the image information of the gravestone being received by the communicator in the reception step corresponding with pre-stored image information of the gravestone, and the position information of the mobile terminal received by the communicator in the reception step corresponding with pre-stored position information of the gravestone, wherein the deceased person's identification information identifies the deceased and is associated with the pre-stored image information of the gravestone along with the pre-stored position information of the gravestone;

a first message output step in which the processor of the message display apparatus outputs and displays a first message on the mobile terminal, wherein the first message is associated with the deceased person's identification information specified by the processor in the deceased person specification step, and pre-stored;

a browsing control step in which the processor of the message display apparatus controls the first message so as to be unbrowsable in the mobile terminal for a predetermined period after a browsable period has elapsed, based on pre-stored browsable period information showing the browsable period of the first message, and controls the first message so as to be browsable in response to the communicator receiving the image information of the gravestone along with the position information of the mobile terminal in the reception step after the predetermined period has elapsed; and a second message output step in which, in response to the communicator receiving the image information of the gravestone along with the position information of the mobile terminal after the predetermined period has elapsed, the processor of the message display apparatus outputs and displays a second message on the mobile terminal, wherein the second message is associated with the deceased person's identification information specified by the processor in the deceased person specification step, and pre-stored;

determining that a reception time at which the reception step occurs is within a first distribution period based on pre-stored first distribution period information showing the first distribution period in which the first message can be output on the mobile terminal;

determining that the reception time is within a second distribution period based on pre-stored second distribution period information showing the second distribution period in which the second message can be output on the mobile terminal;

outputting and displaying the first message on the mobile terminal when the reception time is within the first distribution period;

outputting and displaying the second message on the mobile terminal when the reception time is within the second distribution period; and controlling the first message so as to be browsable in the mobile terminal when the reception time is within the second distribution period.

* * * * *

UNITED STATES PATENT AND TRADEMARK OFFICE
CERTIFICATE OF CORRECTION

PATENT NO. : 10,639,224 B2
APPLICATION NO. : 15/768088
DATED : May 5, 2020
INVENTOR(S) : Hiroshi Nagayama Page 1 of 1

It is certified that error appears in the above-identified patent and that said Letters Patent is hereby corrected as shown below:

In the Specification

At Column 23, Lines 30-31, "pro-notification" is changed to "pre-notification".

At Column 23, Line 52, "pro-notification" is changed to "pre-notification".

At Column 23, Line 54, "pro-notification" is changed to "pre-notification".

Signed and Sealed this
Eleventh Day of August, 2020

Andrei Iancu
*Director of the United States Patent and Trademark Office*